(12) United States Patent
Nishikawa

(10) Patent No.: US 9,544,741 B2
(45) Date of Patent: Jan. 10, 2017

(54) TERMINAL

(71) Applicant: PANASONIC INTELLECTUAL PROPERTY MANAGEMENT CO., LTD., Osaka (JP)

(72) Inventor: Junji Nishikawa, Osaka (JP)

(73) Assignee: PANASONIC INTELLECTUAL PROPERTY MANAGEMENT CO., LTD., Osaka-shi (JP)

(*) Notice: Subject to any disclaimer, the term of this patent is extended or adjusted under 35 U.S.C. 154(b) by 462 days.

(21) Appl. No.: 14/157,535

(22) Filed: Jan. 17, 2014

(65) Prior Publication Data

US 2014/0206383 A1 Jul. 24, 2014

(30) Foreign Application Priority Data

Jan. 18, 2013 (JP) .................... 2013-007917
Jan. 25, 2013 (JP) .................... 2013-012664

(51) Int. Cl.
*H04W 4/02* (2009.01)
*H04W 4/04* (2009.01)
(Continued)

(52) U.S. Cl.
CPC ............. *H04W 4/046* (2013.01); *G01S 19/14* (2013.01); *G01S 19/33* (2013.01); *G01S 19/45* (2013.01); *H04W 4/028* (2013.01)

(58) Field of Classification Search
CPC ........ H04W 4/02; H04W 4/025; H04W 4/028; H04W 4/04; H04W 4/046; G01C 21/10; G01C 21/12; G01C 21/16; G01C 21/165; G01S 19/01; G01S 19/03; G01S 19/05; G01S 19/07; G01S 19/10; G01S 19/11; G01S 19/13; G01S 19/23; G01S 19/33; G01S 19/38; G01S 19/39; G01S 19/42; G01S 19/43; G01S 19/44; G01S 19/45; G01S 19/47; G01S 19/48; G01S 19/49; G01S 19/14
See application file for complete search history.

(56) References Cited

U.S. PATENT DOCUMENTS 5,311,194 A * 5/1994 Brown .................... G01S 19/11
                                                342/357.24
5,311,195 A * 5/1994 Mathis .................... G01S 19/49
                                                342/357.29
(Continued)

FOREIGN PATENT DOCUMENTS

JP  2004-356970 A  12/2004
JP  2005-221449 A  8/2005
(Continued)

*Primary Examiner* — Bernarr Gregory
(74) *Attorney, Agent, or Firm* — Shinjyu Global IP

(57) ABSTRACT

A terminal to be carried into a moving object includes a first information obtaining unit, a time stamp adding unit, a second information obtaining unit, and an integration unit. The first information obtaining unit obtains positional information of the terminal. The time stamp adding unit adds a timestamp to the positional information obtained by the first information obtaining unit. The second information obtaining unit obtains, from the moving object, the positional information of the moving object having a timestamp added in the same time unit as the timestamp added by the object time stamp adding unit. The integration unit integrates positional information having a timestamp for which no positional information has been obtained by the first information obtaining unit, selectively from the positional information obtained by the second information obtaining unit, with the positional information obtained by the second information obtaining unit.

9 Claims, 30 Drawing Sheets

(51) Int. Cl.
*G01S 19/14* (2010.01)
*G01S 19/33* (2010.01)
*G01S 19/45* (2010.01)
*H04W 4/00* (2009.01)
*G01S 19/00* (2010.01)

(56) References Cited

U.S. PATENT DOCUMENTS

| | | | | |
|---|---|---|---|---|
| 5,461,388 A * | 10/1995 | Applegate | | G01S 19/49 |
| | | | | 342/357.62 |
| 5,510,798 A * | 4/1996 | Bauer | | G01S 19/07 |
| | | | | 342/357.31 |
| 5,543,804 A * | 8/1996 | Buchler | | G01S 19/47 |
| | | | | 342/357.23 |
| 5,719,764 A * | 2/1998 | McClary | | G01C 21/165 |
| | | | | 700/79 |
| 5,781,151 A * | 7/1998 | Stratton | | G01S 19/44 |
| | | | | 342/357.48 |
| 5,786,773 A * | 7/1998 | Murphy | | G01S 19/07 |
| | | | | 340/947 |
| 5,787,384 A * | 7/1998 | Johnson | | G01C 21/165 |
| | | | | 701/472 |
| 5,923,287 A * | 7/1999 | Lennen | | G01S 19/33 |
| | | | | 342/357.73 |
| 6,292,132 B1 * | 9/2001 | Wilson | | G01S 19/43 |
| | | | | 342/357.31 |
| 6,741,209 B2 * | 5/2004 | Lee | | G01S 19/23 |
| | | | | 342/357.32 |
| 8,310,396 B2 * | 11/2012 | Syrjarinne | | G01S 19/05 |
| | | | | 342/357.43 |
| 8,452,306 B2 * | 5/2013 | Qahwash | | H04W 4/02 |
| | | | | 340/901 |
| 2011/0128183 A1* | 6/2011 | Marshall | | G01S 19/48 |
| | | | | 342/357.29 |
| 2012/0066261 A1 | 3/2012 | Saka | | |

FOREIGN PATENT DOCUMENTS

JP 2005-241265 A 9/2005
WO WO-2010/131333 A1 11/2010

* cited by examiner

| time | positional information |
|---|---|
| 7:58 | P1 |
| 7:59 | P2 |
| 8:00 | P3 |
| 8:20 | P23 |
| 8:21 | - |
| 8:22 | - |
| 8:23 | - |
| 8:24 | - |
| 8:25 | - |
| 8:26 | - |
| 12:28 | - |
| 12:29 | - |
| 12:30 | P24 |
| 12:31 | P25 |
| 12:32 | P26 |

| time | positional information |
|---|---|
| 8:07:58 | Q1 |
| 8:07:59 | Q2 |
| 8:08:00 | Q3 |
| 8:22:59 | Q902 |
| 8:23:00 | Q903 |
| 8:23:01 | Q904 |
| 8:23:02 | Q905 |
| 12:29:58 | Q15721 |
| 12:29:59 | Q15722 |
| 12:32:00 | Q15843 |

FIG. 5B

| time | positional information |
|---|---|
| 8:23 | Q903 |
| 8:24 | Q963 |
| 8:25 | Q1023 |
| 8:26 | Q1083 |
| 12:28 | Q15603 |
| 12:29 | Q15663 |
| 12:30 | Q15723 |
| 12:31 | Q15783 |
| 12:32 | Q15843 |

| time | positional information | obtained information |
|---|---|---|
| 7:58 | P1 | |
| 7:59 | P2 | |
| 8:00 | P3 | |
| 8:20 | P23 | |
| 8:21 | Q783 | ● |
| 8:22 | Q843 | ● |
| 8:23 | Q903 | ● |
| 8:24 | Q963 | ● |
| 8:25 | Q1023 | ● |
| 8:26 | Q1083 | ● |
| 12:28 | Q15603 | ● |
| 12:29 | Q15663 | ● |
| 12:30 | P24 | |
| 12:31 | P25 | |
| 12:32 | P26 | |

| time | action information |
|---|---|
| 7:58 | play game |
| 7:59 | play game |
| 8:00 | play game |
| 8:01 | play game |
| 8:03 | power off |
| 8:33 | power on |
| 9:20 | scheduling |
| 11:40 | notepad |
| 12:20 | power off |
| 12:30 | power on |
| 12:31 | obtain action information |

FIG. 17B

| time | action information | in-flight information |
|---|---|---|
| 8:08 | seating | flight information |
| 8:23 | take-off | |
| 8:33 | in-flight guidance by CA | |
| 8:38 | play music | |
| 8:50 | call CA | |
| 9:01 | play video | |
| 11:30 | selected meal A | |
| 12:20 | in-flight guidance by CA | |
| 12:29 | landing | outside temperature |

FIG. 18

| time | action information | obtained information | action information | obtained information | in-flight information | obtained information |
|---|---|---|---|---|---|---|
| 7:58 | play game | | | | | |
| 7:59 | play game | | | | | |
| 8:00 | play game | | | | | |
| 8:01 | play game | | | | | |
| 8:03 | power off | | | | | |
| 8:08 | seating | | | | in-flight information | ● |
| 8:23 | take-off | | | | | |
| 8:33 | power on | | in-flight guidance by CA | ● | | |
| 8:38 | play music | ● | | | | |
| 8:50 | call CA | ● | | | | |
| 9:01 | play video | ● | | | | |
| 9:20 | scheduling | | | | | |
| 11:30 | selected meal A | ● | | | | |
| 11:40 | notepad | | | | | |
| 12:20 | power off | | in-flight guidance by CA | ● | | |
| 12:29 | landing | ● | | | outside temperature | ● |
| 12:30 | power on | | | | | |
| 12:31 | obtain action information | | | | | |

| time | positional information | action information |
|---|---|---|
| 7:58 | P1 | play game |
| 7:59 | P2 | play game |
| 8:00 | P3 | play game |
| 8:01 | P4 | play game |
| 8:02 | P5 | |
| 8:03 | P6 | |
| 8:04 | P7 | |
| 8:20 | P23 | power off |
| 8:21 | - | |
| 8:22 | - | |
| 8:33 | - | power on |
| 9:20 | - | scheduling |
| 11:40 | - | notepad |
| 12:20 | - | power off |
| 12:29 | - | |
| 12:30 | P24 | power on |
| 12:31 | P25 | obtain action information and positional information |
| 12:32 | P26 | |

FIG. 23

| time | positional information | action information | in-flight information |
|---|---|---|---|
| 8:08 | Q3 | seating | flight information |
| 8:23 | Q903 | take-off | |
| 8:24 | Q963 | | |
| 8:25 | Q1203 | | |
| 8:26 | Q1083 | | |
| 8:33 | Q1503 | in-flight guidance by CA | |
| 8:38 | Q1803 | play music | |
| 8:50 | Q2523 | call CA | |
| 9:01 | Q3183 | play video | |
| 11:30 | Q12123 | selected meal A | calorie information |
| 12:20 | Q15123 | in-flight guidance by CA | |
| 12:29 | Q15663 | landing | outside temperature |
| 12:30 | Q15723 | | |
| 12:31 | Q15783 | | |
| 12:32 | Q15843 | | |

FIG. 24

| time | positional information | obtained information | action information | obtained information | action information | obtained information | In-flight information | obtained information |
|---|---|---|---|---|---|---|---|---|
| 7:58 | P1 | | play game | | | | | |
| 7:59 | P2 | | play game | | | | | |
| 8:00 | P3 | | play game | | | | | |
| 8:01 | P4 | | play game | | | | | |
| 8:02 | P5 | | | | | | | |
| 8:03 | P6 | | | | | | | |
| 8:04 | P7 | | | | | | | |
| 8:08 | P11 | | seating | ● | | | | |
| 8:09 | P12 | | power off | | | | | |
| 8:20 | P23 | | | | | | | |
| 8:21 | Q783 | ● | | | | | | |
| 8:22 | Q843 | ● | | | | | | |
| 8:23 | Q903 | ● | take-off | ● | | | | |
| 8:24 | Q963 | ● | | | | | | |
| 8:33 | Q1503 | ● | power on | | | | | |
| 8:38 | Q1803 | ● | play music | ● | | | | |
| 8:50 | Q2523 | ● | | | | | flight information | ● |
| 9:01 | Q3183 | ● | play video | ● | in-flight guidance by CA | ● | | |

FIG. 25A

| time | positional information | obtained information | action information | obtained information | action information | obtained information | in-flight information | obtained information |
|---|---|---|---|---|---|---|---|---|
| 9:20 | Q4323 | ● | scheduling | | | | | |
| 11:30 | Q12123 | ● | selected meal A | ● | | | calorie information | ● |
| 11:40 | Q12723 | ● | notepad | | | | | |
| 12:20 | Q15123 | ● | power off | | in-flight guidance by CA | ● | | |
| 12:29 | Q15663 | ● | landing | ● | | | | |
| 12:30 | P24 | | power on | | | | | |
| 12:31 | P25 | | obtain action information and positional information | | | | outside temperature | ● |
| 12:32 | P26 | | | | | | | |

FIG. 25B

| time | positional information | obtained information | action information | obtained information | action information | obtained information | In-flight information | obtained information |
|---|---|---|---|---|---|---|---|---|
| 7:58 | P1 | | play game | | | | | |
| 7:59 | P2 | | play game | | | | | |
| 8:00 | P3 | | play game | | | | | |
| 8:01 | P4 | | play game | | | | | |
| 8:02 | P5 | | | | | | | |
| 8:03 | P6 | | | | | | | |
| 8:04 | P7 | | | | | | | |
| 8:08 | Q3 | ● | seating | ● | | | | |
| 8:09 | Q63 | ● | | | | | | |
| 8:20 | Q723 | ● | power off | | | | | |
| 8:21 | Q783 | ● | | | | | | |
| 8:22 | Q843 | ● | | | | | | |
| 8:23 | Q903 | ● | take-off | ● | | | | |
| 8:24 | Q963 | ● | | | | | | |
| 8:33 | Q1503 | ● | power on | | in-flight guidance by CA | ● | | |
| 8:38 | Q1803 | ● | play music | ● | | | | |
| 8:50 | Q2523 | ● | | | | | flight information | ● |
| 9:01 | Q3183 | ● | play video | ● | | | | |

FIG. 26A

| time | positional information | obtained information | action information | obtained information | action information | obtained information | in-flight information | obtained information |
|---|---|---|---|---|---|---|---|---|
| 9:20 | Q4323 | ● | scheduling | | | | | |
| 11:30 | Q12123 | ● | selected meal A | ● | | | calorie information | ● |
| 11:40 | Q12723 | ● | notepad | | | | | |
| 12:20 | Q15123 | ● | power off | | in-flight guidance by CA | ● | | |
| 12:29 | Q15663 | ● | landing | ● | | | | |
| 12:30 | Q15723 | ● | power on | | | | | |
| 12:31 | Q15783 | ● | obtain action information and positional information | | | | outside temperature | ● |
| 12:32 | Q15843 | ● | | | | | | |

FIG. 26B

TERMINAL

CROSS REFERENCE TO RELATED APPLICATIONS

This application claims priority to Japanese Patent Application No. 2013-007917 filed on Jan. 18, 2013 and Japanese Patent Application No. 2013-012664 filed on Jan. 25, 2013, the entire contents of which are incorporated by reference herein.

BACKGROUND

Technical Field

The disclosure relates to a portable terminal.

Description of the Related Art

A lifelog has become common in recent years. A lifelog refers to the technology to record (or log) living, actions, and experience (lives) of humans in the form of digital data including video, audio, and positional information, or refers to such a record.

Recording a lifelog typically uses various sensors or functions of, for example, a mobile phone. The sensors include a digital camera and a watch. The functions include connection to the Internet. For example, a camera capturing a lifelog may be a wearable camera, which is worn for continuous recording (refer to, for example, Japanese Unexamined Patent Publication No. 2004-356970). Systems have been developed to search for information based on such lifelog data (refer to, for example, WO 2010/131333).

A portable terminal, such as a mobile phone or a watch, has functions to obtain various items of information about the surrounding environment of the terminal. Examples of the various items of information include temperature information, atmospheric pressure information, positional information from global positioning system (GPS) satellites, acceleration information, and direction information. The lifelog typically uses positional information.

The position of the user of the terminal can be calculated by using the information obtained from the GPS satellites. The information about the calculated position can be used to record a movement log of the user. The information from the GPS satellites may also be used to obtain information about the local time at a travel destination (refer to, for example, Japanese Patent No. 4487585). In areas where no radio waves can be received from the GPS satellites, such as facilities or underground malls, information tags (e.g., barcodes) may be set to enable positional information to be obtained (refer to, for example, Japanese Patent No. 4015632).

However, the above structures known in the art have the problems described below.

In transportation media, such as airplanes or trains, external GPS radio waves may not be received. In this case, the positions of transportation media may not be identified.

In predetermined environments such as in transportation media or in certain facilities, positional information may be difficult to obtain, and thus a lifelog may be difficult to capture.

The disclosure provides a terminal and an information obtaining method that allows a lifelog to be captured easily in a moving object or in a facility.

SUMMARY

A first aspect of the disclosure provides a terminal to be carried into a moving object or a facility. The terminal includes a first information obtaining unit, a time stamp adding unit, a second information obtaining unit, and an integration unit. The first information obtaining unit obtains positional information of the terminal The time stamp adding unit adds a timestamp to the positional information obtained by the first information obtaining unit. The second information obtaining unit obtains, from the moving object or the facility, positional information of the moving object or positional information of the terminal in the facility having a timestamp added in a predetermined time unit. The integration unit integrates positional information having a timestamp for which no positional information has been obtained by the first information obtaining unit, selectively from the positional information obtained by the second information obtaining unit, with the positional information obtained by the first information obtaining unit.

A second aspect of the disclosure provides a terminal to be carried into a moving object or a facility. The terminal includes a first information obtaining unit, a time stamp adding unit, a second information obtaining unit, and an integration unit. The first information obtaining unit obtains positional information of the terminal. The time stamp adding unit adds a timestamp to the positional information obtained by the first information obtaining unit. The second information obtaining unit obtains, from the moving object or the facility, all positional information of the moving object or positional information of the terminal in the facility having a timestamp added in a predetermined time unit. The integration unit integrates the positional information obtained by the second information obtaining unit and the positional information obtained by the first information obtaining unit by replacing the positional information obtained by the first information obtaining unit with the positional information obtained by the second information obtaining unit when the timestamp added to the positional information obtained by the first information obtaining unit is the same as the timestamp added to the positional information obtained by the second information obtaining unit.

A third aspect of the disclosure provides a terminal to be carried into a moving object or a facility. The terminal includes a first information obtaining unit, a time stamp adding unit, a second information obtaining unit, and an integration unit. The first information obtaining unit obtains positional information of the terminal. The time stamp adding unit adds a timestamp to the positional information obtained by the first information obtaining unit. The second information obtaining unit obtains, from the moving object or the facility, positional information of the moving object or positional information of the terminal in the facility having a timestamp for which no positional information has been obtained by the first information obtaining unit, selectively from positional information of the moving object or positional information of the terminal in the facility having a timestamp added in a predetermined time unit. The integration unit integrates the positional information obtained by the second information obtaining unit and the positional information obtained by the first information obtaining unit.

The terminal of the disclosure can capture a lifelog easily in a moving object or in a facility.

BRIEF DESCRIPTION OF THE DRAWINGS

FIG. 4 shows positional information stored in the terminal shown in FIG. 1.

FIG. 5A shows positional information stored in the airplane shown in FIG. 2.

FIG. 5B shows positional information to be transmitted to the terminal, selectively from positional information stored in the airplane shown in FIG. 2.

FIG. 6 shows positional information integrated in the terminal shown in FIG. 1.

FIG. 17A shows action information stored in the terminal shown in FIG. 13.

FIG. 17B shows action information and in-flight information stored in the airplane shown in FIG. 13.

FIG. 18 shows action information integrated in the terminal shown in FIG. 1.

FIG. 23 shows positional information and action information stored in the terminal shown in FIG. 22.

FIG. 24 shows positional information and action information stored in the airplane shown in FIG. 22.

FIG. 25A shows positional information and action information integrated in the terminal shown in FIG. 22.

FIG. 25B shows positional information and action information integrated in the terminal shown in FIG. 22.

FIG. 26A shows positional information and action information integrated in a terminal according to a modification of the third embodiment.

FIG. 26B shows positional information and action information integrated in the terminal according to a modification of the third embodiment.

DETAILED DESCRIPTION

Embodiments will now be described with reference to the drawings, while unnecessary details may be excluded. To avoid redundancy and to facilitate understanding of persons skilled in the art, for example, matters known in the art may not be described in detail and components that are substantially the same as the components described may not be described.

The following description and the accompanying drawings are provided by the applicant to enable any person skilled in the art to fully understand the disclosure, and are not intended to limit the subject matter claimed.

First Embodiment

A terminal according to an embodiment of the disclosure will now be described with reference to FIGS. 1 to 6.

1. Structure 1-1. Terminal 1

Figure 1:
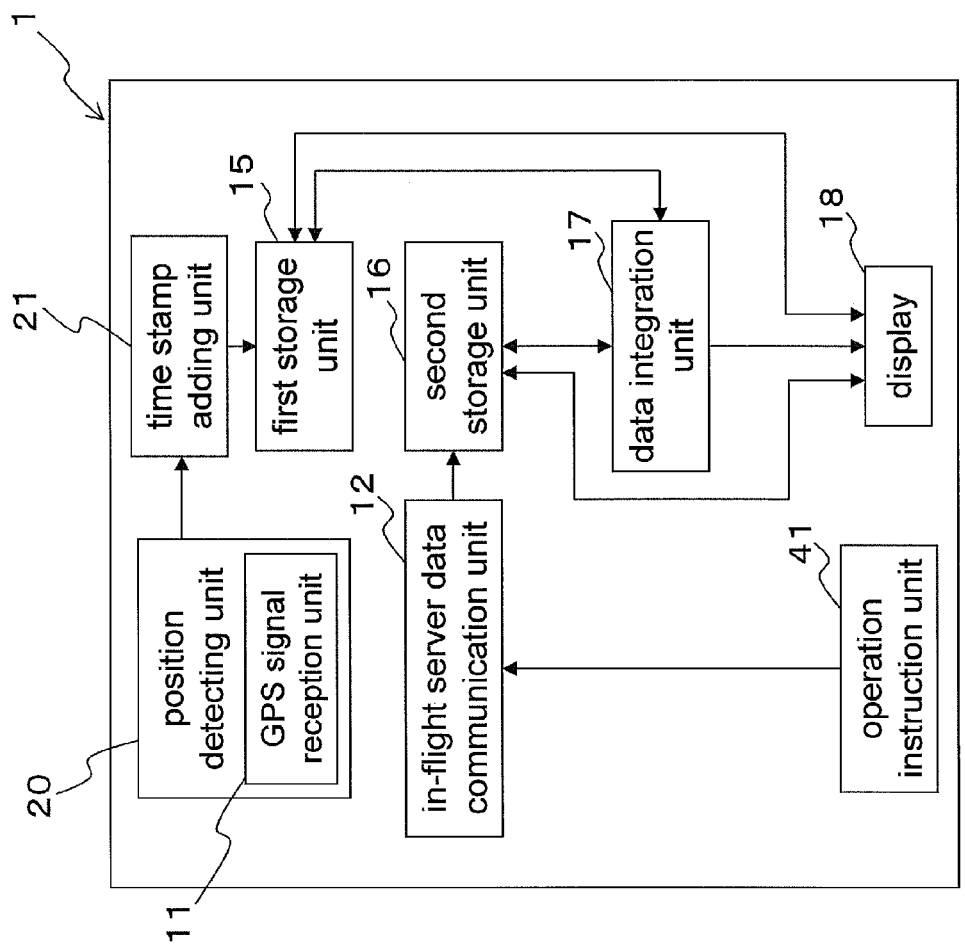
FIG. 1 is a block diagram showing the structure of a terminal according to a first embodiment.

FIG. 1 is a block diagram showing the control performed by a terminal 1 according to the present embodiment.

The terminal 1 of the present embodiment is, for example, a portable wireless terminal, such as a smartphone. As shown in FIG. 1, the terminal 1 includes a position detecting unit 20, an in-flight server data communication unit 12 (an example of a second information obtaining unit), a first storage unit 15, a second storage unit 16, a data integration unit 17 (an example of an integration unit), a display 18, a time stamp adding unit 21, and an operation instruction unit 41.

The position detecting unit 20 includes a global positioning system (GPS) signal reception unit 11 (an example of a first information obtaining unit), and calculates the current position of the wireless terminal based on GPS signals from GPS satellites 2 (refer to FIG. 2 below) received by the GPS signal reception unit 11. The time stamp adding unit 21 adds a timestamp to information about the current position (positional information) of the calculated wireless terminal. The first storage unit 15 stores the positional information calculated by the GPS signal reception unit 11 together with the timestamp.

The in-flight server data communication unit 12 receives positional information of the airplane together with a timestamp from an in-flight server installed on the airplane, and transmits the received positional information having the timestamp to the second storage unit 16. The second storage unit 16 stores the received positional information having the timestamp.

The operation instruction unit 41 activates the in-flight server data communication unit 12. As instructed by the operation instruction unit 41, the in-flight server data communication unit 12 starts receiving information. In the present embodiment, the terminal 1 may be a smartphone, which includes a display 18, such as a liquid crystal display (LCD) screen. The operation instruction unit 41 may be, for example, a touch panel that is integrally incorporated in the display 18.

The data integration unit 17 integrates the positional information calculated based on the GPS signals, which is stored in the first storage unit 15, with the positional information transmitted from the in-flight server data communication unit 12, which is stored in the second storage unit 16. The display 18 may display the integrated positional data.

1-2. Structure of Communication System Including Terminal 1

Figure 2:
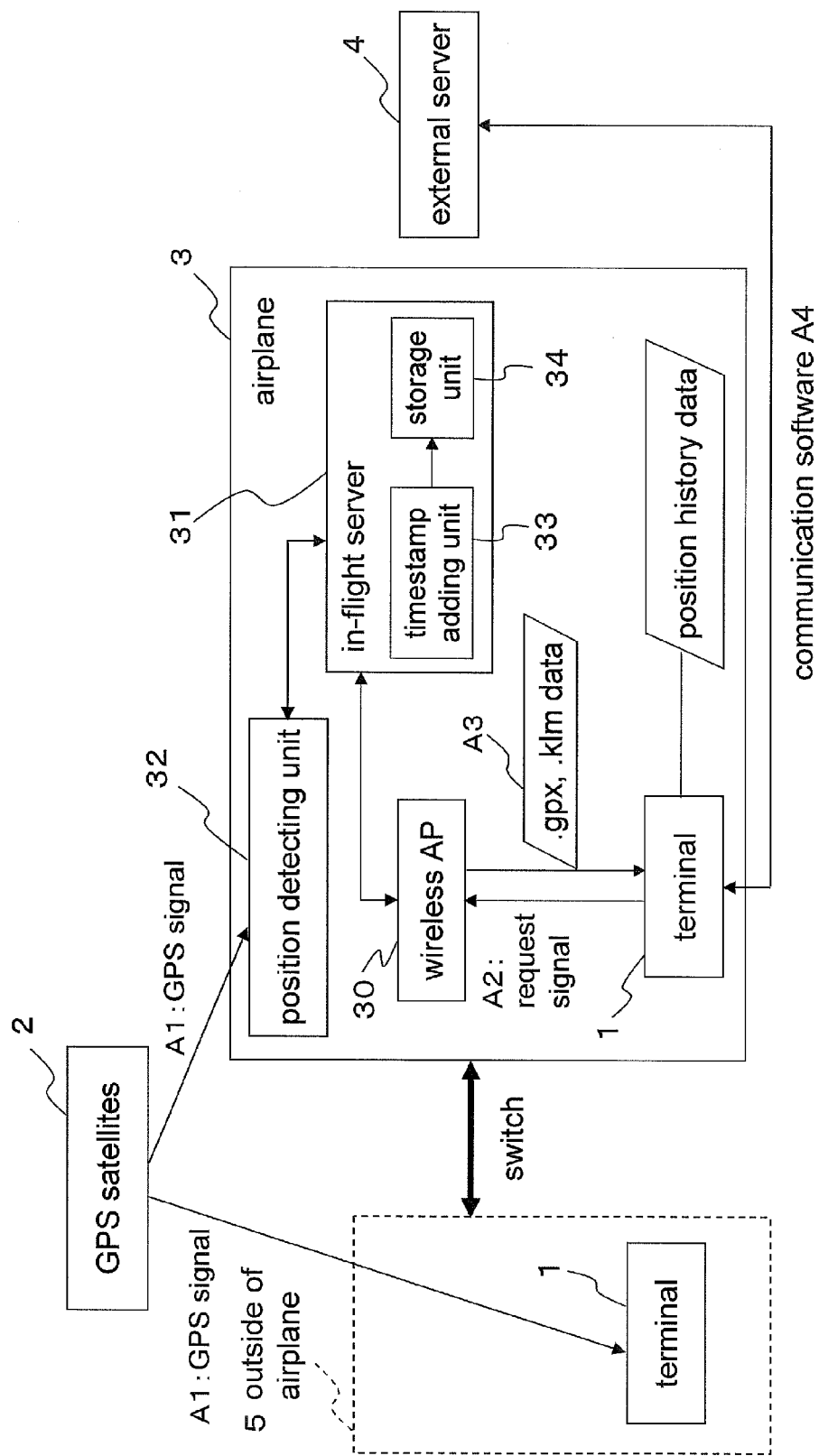
FIG. 2 is a block diagram showing the external structure of the terminal shown in FIG. 1.

The structure of a communication system including the terminal 1 of the present embodiment will now be described. FIG. 2 is a block diagram showing the structure of the communication system including the terminal 1 of the present embodiment.

As shown in FIG. 2, GPS signals A1 are transmitted from the GPS satellites 2 to the terminal 1. The GPS signals A1 are received by the GPS signal reception unit 11 included in the terminal 1. The airplane 3 includes a wireless access point (wireless AP) 30, an in-flight server 31, and a position detecting unit 32. The airplane 3 further includes an external server 4, which is installed by, for example, an airline company. The external server 4 stores communication software A4, which enables communication with the wireless access point 30 in the airplane 3.

The airplane 3 includes one or a plurality of wireless access points 30. The terminal 1 downloads communication software stored in the external server 4 through the Internet to enable its communication with the in-flight server 31 via the wireless access points 30. Such wireless connection may be performed by using, for example, WiFi or near field communication (NFC).

The position detecting unit 32 detects the position of the airplane 3. The position of the airplane 3 is calculated based not only on GPS signals A1 from the GPS satellites 2 but also on radio waves emanating from aviation wireless facilities and signals from stationary satellites, and further based on movement calculations performed using an accelerator and a gyroscope. This allows the position detecting unit 32 to detect the current position correctly while the airplane 3 is moving at high speed.

The in-flight server 31 includes a time stamp adding unit 33 and a storage unit 34. The time stamp adding unit 33 adds a timestamp to the current position detected by the position detecting unit 32. The storage unit 34 stores the current position detected by the position detecting unit 32 together with the timestamp.

In FIG. 2, a dotted line indicates outside 5 of the airplane 3.

2. Operation

An example of a method for obtaining information with the terminal 1 of the present embodiment will now be described.

2-1. Operation at Outside 5 of Airplane

As shown in FIGS. 1 and 2, the terminal 1 at the outside 5 receives GPS signals A1 from the GPS satellites 2 with the GPS signal reception unit 11. The GPS signal reception unit 11 calculates the current position based on the received GPS signals A1. Information about the calculated position (positional information) is stored into the first storage unit 15. The GPS signals are regularly received at predetermined intervals (e.g., at intervals of one minute), and the resulting positional information is stored into the first storage unit 15. This generates a movement log of the user carrying the terminal 1. For example, the movement log may be displayed together with a map on the display 18.

2-2. Operation in Airplane 3

Figure 3:
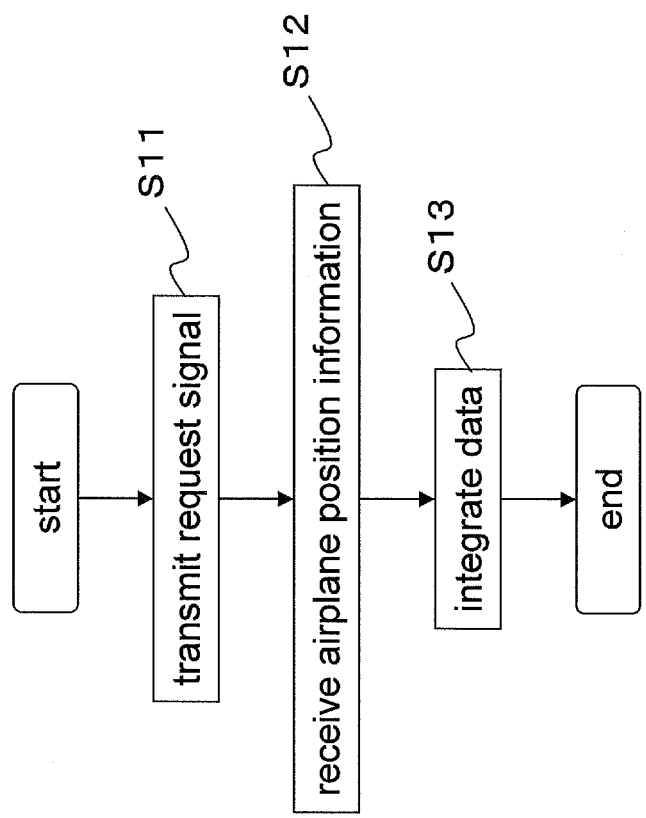
FIG. 3 is a flowchart showing the control performed by the terminal shown in FIG. 1.

FIG. 3 is a flowchart showing the control performed by the terminal 1 of the present embodiment.

Before the user of the terminal 1 enters the airplane 3, as shown in FIG. 2, the user downloads the communication software A4 in advance from the external server 4 into the terminal 1.

As shown in step S11 in FIG. 3, the user operates the operation instruction unit 41 when the airplane 3 lands, and then a request signal A2 is transmitted from the terminal 1.

In the airplane 3, as shown in FIG. 2, the current position is constantly calculated (e.g., at intervals of one second) by the position detecting unit 32 using GPS signals A1 from the GPS satellites 2, radio waves from terrestrial aviation wireless facilities, and signals from stationary satellites. The calculated current positions are sequentially stored into the storage unit 34 of the in-flight server 31 together with the corresponding timestamps.

In response to the request signal A2, as shown in step S12, the in-flight server 31 transmits airplane positional information A3 having the timestamp to the in-flight server data communication unit 12 via the wireless access point 30. The airplane positional information A3 may be in a commonly used format, such as eXtensible Markup Language (XML). More specifically, it is preferable that the positional information is transmitted to the terminal 1 in an XML-based format, such as GPS eXchange (GPX) format and KML format. Information transmitted in such formats can be easily integrated in the terminal 1. Transmitting the request signal A2 to the in-flight server 31 and receiving the airplane positional information A3 from the in-flight server 31 may use a common protocol used for web services, such as the Hypertext Transfer Protocol (HTTP). In this case, information about the moving object can be transmitted without requiring an additional dedicated protocol.

In step S13, the airplane positional information A3 stored in the second storage unit 16 is integrated with the positional information stored in the first storage unit 15. In other words, the terminal 1 uses the airplane positional information A3 obtained from the airplane 3 as the positional information of the terminal 1.

The user can display, on the display 18, his or her movement log including the movement of the airplane 3, together with the positional information stored in the first storage unit 15.

Receiving the airplane positional information (S12) and integrating the data (S13) will now be described in detail.

FIG. 4 shows the positional information of the terminal 1 stored in the first storage unit 15 of the terminal 1. As shown in FIG. 4, the time (timestamp) and the positional information are stored in pairs. In FIG. 4, P1 to P30 indicate positional information. In the example shown in FIG. 4, the airplane 3 takes off at 8:23, and lands at 12:29. Thus, no positional information is available between 8:25 and 12:28, during which the terminal 1 is in the airplane 3 and cannot receive the GPS signals A1 because the terminal 1 may be powered off or the airplane 3 may be moving at high speed.

FIG. 5A shows the positional information of the airplane 3 stored in the storage unit 34 of the airplane 3. As shown in FIG. 5A, the timestamp and the positional information are stored in pairs. The storage unit 34 stores positional information Q1 to Q15843 of the airplane 3 between 8:07:58 to 12:32:00. As shown in FIG. 5A, the positional information may be stored in the storage unit 34 of the airplane 3 in seconds, whereas the positional information may be stored in the first storage unit 15 of the terminal 1 in minutes as shown in FIG. 4.

In the step in which the airplane positional information is received (S12), the in-flight server data communication unit 12 receives positional information of the airplane having timestamps added in the same time unit as the timestamps added by the time stamp adding unit 21. More specifically, when the time stamp adding unit 21 of the terminal 1 adds timestamps in minutes, the in-flight server data communication unit 12 receives only positional information of the airplane 3 having timestamps added in minutes. More specifically, the in-flight server data communication unit 12 receives only positional information having timestamps with 00 seconds. When no positional information having a timestamp with 00 seconds is available, the in-flight server data communication unit 12 may selectively receive, for example, positional information having a timestamp indicating the shortest elapsed time.

FIG. 5B shows positional information of the airplane 3 received by the terminal 1 and the corresponding timestamps. As shown in FIG. 5B, the in-flight server 31 transmits only positional information having timestamps with 00 seconds, such as positional information Q903 having a timestamp of 8:23:00 and positional information Q963 having a timestamp of 8:24:00, selectively from the positional information Q1 to Q15843 having timestamps from 8:07:58 to 12:32:00. The terminal 1 receives the transmitted positional information.

FIG. 6 shows data obtained by integrating the positional information of the airplane 3 with the positional information of the terminal 1. As shown in FIG. 6, the data integration unit 17 integrates only the positional information having timestamps for which no positional information has been obtained by the terminal 1 with the positional information of the terminal 1. More specifically, as shown in FIG. 4, the data is integrated by filling the missing positional information that has not been obtained by the terminal 1, or specifically by filling the missing positional information corresponding to the timestamps in minutes from 8:21 to 12:29, with the corresponding positional information of the airplane 3 (FIG. 5B). In FIG. 6, the positional information obtained by the terminal 1 is identified by the letter P, whereas the positional information obtained by the airplane 3 is identified by the letter Q. The positional information identified by P and the positional information identified by Q are both simply the positional information, for which the source of the information cannot be identified. To identify the information source either as the airplane 3 or the position detecting unit 20 of the terminal 1, the positional information obtained from the airplane 3 is further provided with information about the information source. In FIG. 6, the solid circles each indicate positional information obtained from the airplane 3.

As described above, airplane positional information having timestamps added in the same unit as the timestamps added by the time stamp adding unit 21, or airplane positional information having timestamps added in a unit similar to the time unit in which the timestamps are added by the time stamp adding unit 21 is obtained. From the obtained airplane positional information, only the positional information having timestamps for which no positional information has been obtained by the terminal 1 is selectively integrated with the positional information of the terminal 1.

3. Advantages 3-1.

As described above, the terminal 1 in the present embodiment that can be carried into the airplane 3 includes the in-flight server data communication unit 12. The in-flight server data communication unit 12 obtains the airplane positional information A3 from the airplane 3.

This structure allows the terminal 1 to obtain positional information from the airplane 3 and thus obtain more precise information.

3-2.

In the present embodiment, the terminal 1 includes the GPS signal reception unit 11, which obtains the positional information of the terminal 1.

This structure allows the terminal 1 to obtain positional information of the airplane 3 in the airplane, while also allowing the terminal 1 to obtain positional information calculated based on the GPS signals received by the GPS signal reception unit 11 at the outside 5 of the airplane.

3-3.

In the present embodiment, the terminal 1 includes the data integration unit 17, which integrates the positional information of the terminal 1 received by the GPS signal reception unit 11 with the positional information of the airplane 3 received from the in-flight server data communication unit 12.

This structure allows the terminal 1 to use the positional information of the airplane 3 as the positional information of the terminal 1. In particular, when positional information cannot be received by the GPS signal reception unit 11 of the terminal 1 in a moving object moving at high speed, such as the airplane 3, the positional information of the airplane 3 can instead be used as the positional information of the terminal 1. This allows the terminal 1 to obtain precise positional information, and allows a continuous lifelog to be captured.

3-4.

In the present embodiment, the terminal 1 receives the GPS signals with the GPS signal reception unit 11 and calculates the positional information using the GPS signals at the outside 5, whereas the terminal 1 obtains the airplane positional information from the in-flight server 31 in the airplane 3.

This structure allows the movement log of the user to include routes of movement on the airplane 3, in addition to routes of movement at the outside 5 of the airplane.

3-5.

In the above embodiment, as described above, the portable terminal 1 that can be carried into the airplane 3 includes the GPS signal reception unit 11 (an example of a first information obtaining unit), the time stamp adding unit 21, the in-flight server data communication unit 12 (an example of a second information obtaining unit), and the data integration unit 17 (an example of an integration unit). The GPS signal reception unit 11 obtains the positional information of the terminal 1. The time stamp adding unit 21 adds a timestamp to the positional information obtained by the GPS signal reception unit 11. The in-flight server data communication unit 12 obtains, from the airplane 3, all the positional information of the airplane 3 having timestamps added in the same time unit as the timestamps added by the time stamp adding unit 21 while the terminal 1 is being carried in the airplane 3. The data integration unit 17 integrates the positional information having timestamps for which no positional information has been received by the GPS signal reception unit 11, selectively from all the positional information obtained by the in-flight server data communication unit 12, with the positional information obtained by the GPS signal reception unit 11.

This allows the terminal 1 to obtain positional information from the airplane 3 to fill the missing positional information that has not been obtained, and thus allows a continuous lifelog to be captured easily.

4. Other Embodiments

Although the disclosure has been described based on the embodiment, the disclosure should not be limited to the above embodiment, and may be modified without departing from the spirit and scope of the disclosure.

(A) Although the above embodiment describes the case in which the airplane 3 is an example of the moving object, the moving object should not be limited to an airplane, but may be a train, a car, or a ship. It is only required that the moving object changes its position with time.

More specifically, the terminal 1 in the above embodiment obtains the positional information of the airplane. When the moving object is a train, the terminal 1 obtains positional information of the train.

Further, the disclosure should not be limited to transportation media, but may be applicable to facilities. In a library as an example of such facilities, DVDs can be viewed. A seat on which the user has viewed a DVD on a DVD player may be recorded into a server system of the library as positional information of the user (terminal 1), together with, for example, a library user card number. The record may then be received by the terminal 1. To receive such information, the library user card number can be used to identify the positional information of the user. Such facilities should not be limited to a library, but may be, for example, a concert venue or an academic conference venue.

Alternatively, the disclosure may be applied to a work gym, in which positional information indicating the position of a work gym machine on which the user works and the corresponding time may be recorded into a server installed at the work gym. The terminal 1 may then receive the recorded information.

(B)

Figure 7:
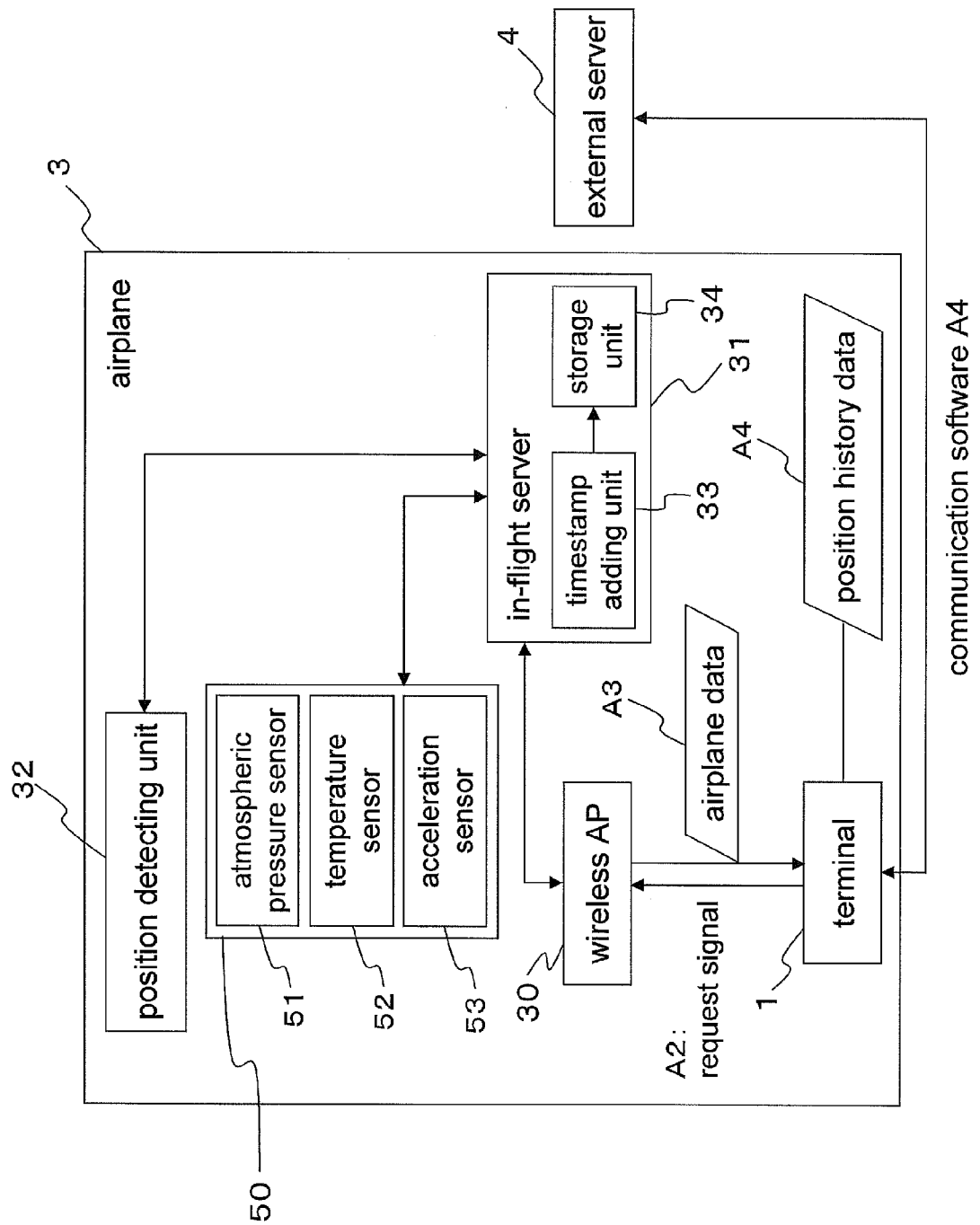
FIG. 7 is a block diagram showing the structure of an airplane according to a modification of the first embodiment.

(B-1) In the above embodiment, the terminal 1 includes the in-flight server data communication unit 12, which serves as an example of a first information obtaining unit, and obtains the airplane positional information as an example of information about the moving object. The information obtained by the in-flight server data communication unit 12 should not be limited to the positional information, but may be information about atmospheric pressure, temperature, acceleration, directions, or altitude. FIG. 7 is a block diagram showing the structure of the airplane 3 including an airplane information obtaining unit 50, which includes an atmospheric pressure sensor 51, a temperature sensor 52, and an acceleration sensor 53.

As shown in FIG. 7, the airplane 3 includes the atmospheric pressure sensor 51, which measures the atmospheric pressure in the airplane. Information about the atmospheric pressure may be recorded into the in-flight server 31. The terminal 1 may then obtain the atmospheric pressure information (an example of airplane information A3 shown in FIG. 7, or in-flight information in an embodiment below), as the information about the moving object. The atmospheric pressure information can be used to examine the effect of the atmospheric pressure on the physical conditions of passengers of the moving object.

The airplane 3 may include the temperature sensor 52. Information about the temperature may be recorded into the in-flight server 31. The terminal 1 may then obtain the temperature information as the information about the moving object. This structure allows the temperature information to be obtained more easily and more correctly than when the temperature in the moving object is measured by using a watch that can measure the temperature.

The airplane 3 may include the acceleration sensor 53 or the like. Information obtained by the acceleration sensor 53 may be recorded into the server of the moving object. This allows the terminal 1 to obtain information about the speed or acceleration as the information about the moving object. The information about the speed or acceleration can be used to record changes in the speed of the moving object.

The information to be obtained should not be limited to the positional information of the moving object including the airplane and its acceleration and the atmospheric pressure and the temperature in the moving object, and may be any information about the moving object including the altitude and directions of the moving object, and the external atmospheric pressure or outside temperature of the moving object.

Figure 8:
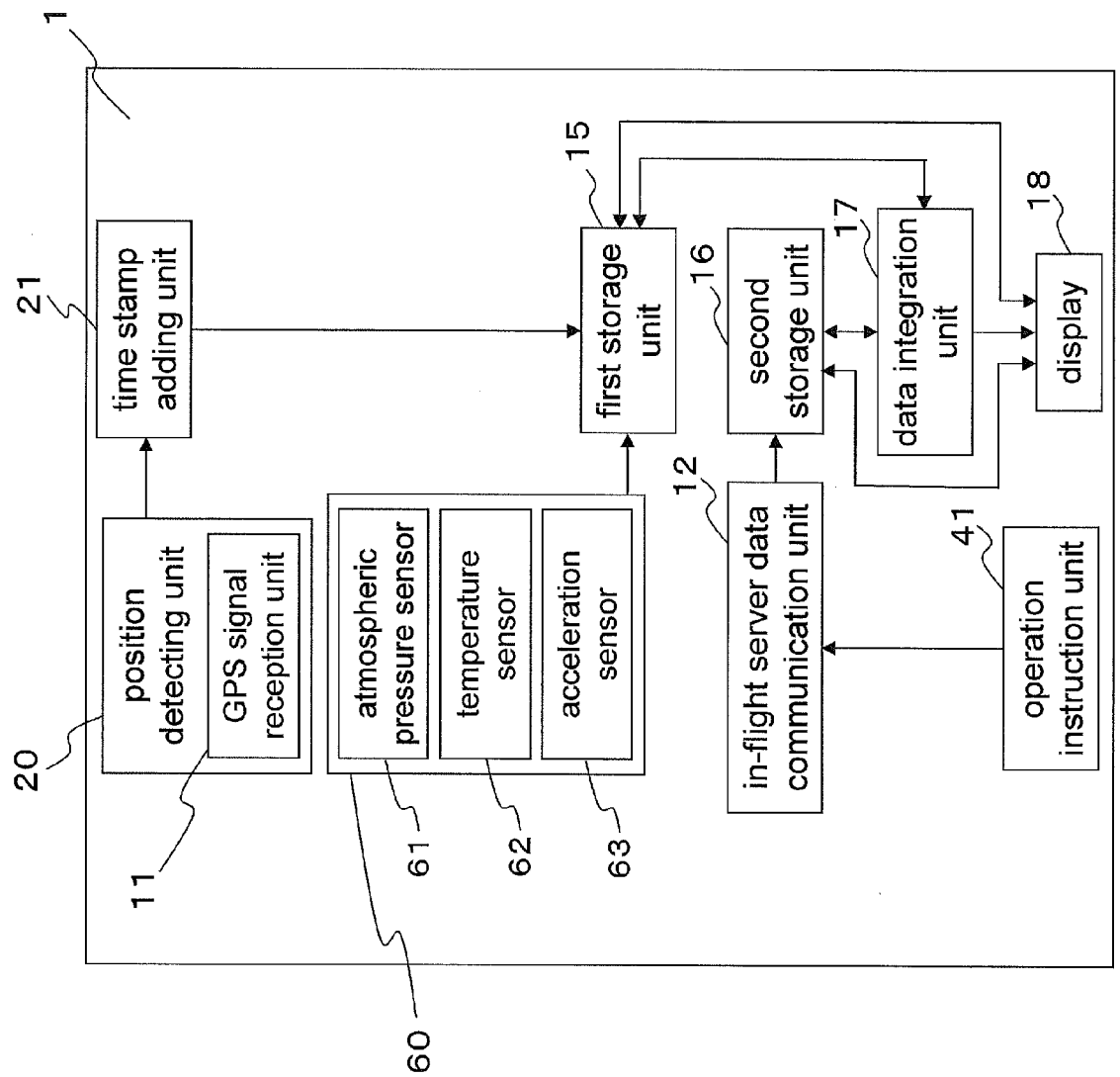
FIG. 8 is a block diagram showing the structure of a terminal according to a modification of the embodiment.

(B-2) In the above embodiment, the terminal 1 includes the GPS signal reception unit 11 as an example of a first information obtaining unit, which receives the GPS signals representing information about the position as an example of the information about the terminal. However, the information to be obtained should not be limited to the information about the position, but may be other information described in the modification (B-1) above, such as information about atmospheric pressure, temperature, and acceleration. FIG. 8 is a block diagram showing the structure of the terminal 1 including a terminal information obtaining unit 60, which includes an atmospheric pressure sensor 61, a temperature sensor 62, and an acceleration sensor 63. Information obtained by these sensors may then be stored in the first storage unit 15.

For example, the terminal 1 may receive atmospheric pressure information, temperature information, and acceleration information in the airplane 3 from the in-flight server data communication unit 12 as shown FIG. 7, and may integrate the received information with the information obtained by the atmospheric pressure sensor 61, the temperature sensor 62, and the acceleration sensor 63 of the terminal 1. This allows a continuous log of changes in the atmospheric pressure, temperature, and acceleration to be obtained.

As described above, the items of "information about the terminal" obtained by the terminal are the same as the items of "information about the moving object" obtained from the moving object by the terminal. This allows continuous information to be obtained without causing discontinuity during the movement of the moving object. The items of information include the position, atmospheric pressure, temperature, acceleration, and so on. The "information about the terminal" may be information about the surrounding of the terminal. The "information about the moving object" may be information about the surrounding of the moving object or information about the inside of the moving object. The information about the surrounding of the terminal includes information identifying the state of the terminal and information dependent on the external conditions of the terminal, and may further include information that changes with time or with movement. The information about the surrounding of the moving object may include information identifying the state of the moving object and information dependent on the external conditions of the moving object, and may further include information that changes with time or with movement.

(C) In the above embodiment, the GPS signals are received by the GPS signal reception unit 11 and the data stored in the in-flight server is received by the in-flight server data communication unit 12. Alternatively, the operation may be switched between receiving GPS signals with the GPS signal reception unit 11 and receiving data stored in the in-flight server with the in-flight server data communication unit 12.

Figure 9:
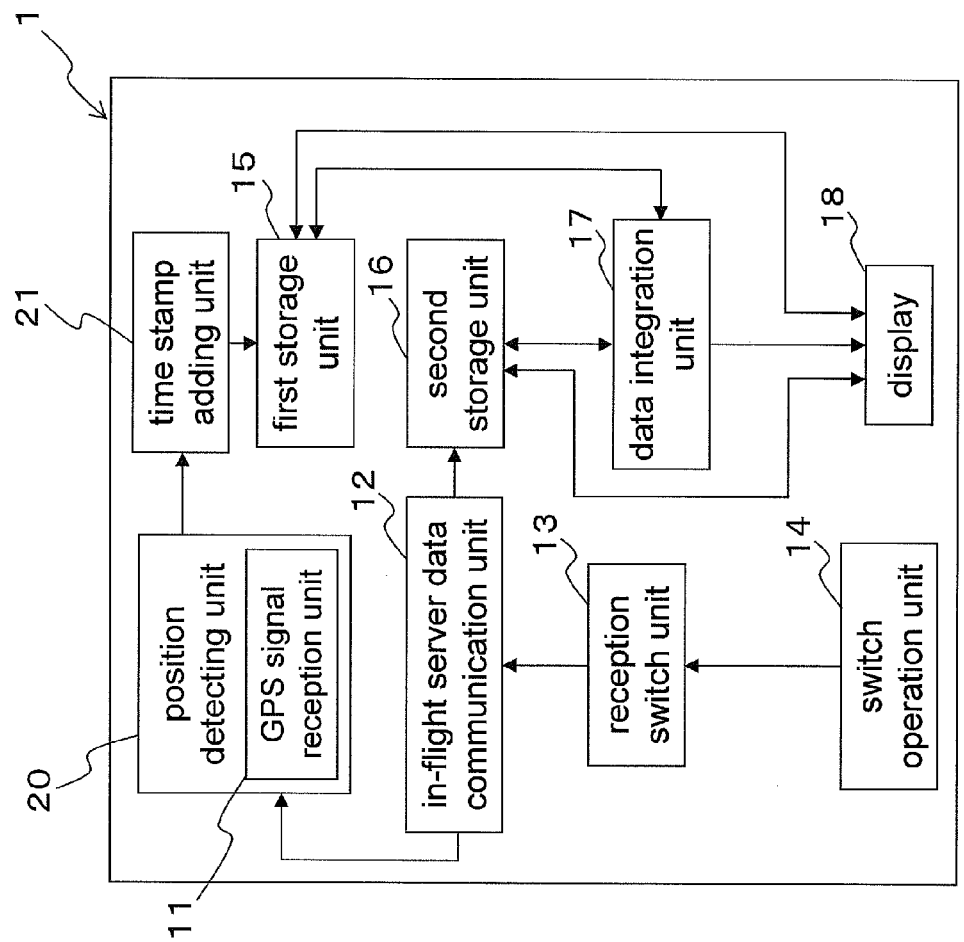
FIG. 9 is a block diagram showing the structure of a terminal according to a modification of the embodiment.

FIG. 9 shows the structure differing from the structure shown in FIG. 1 in that the operation instruction unit 41 is eliminated and a reception switch unit 13 and a switch operation unit 14 are added. The reception switch unit 13 switches the operation between receiving the GPS signals with the GPS signal reception unit 11 and receiving the data stored in the in-flight server with the in-flight server data communication unit 12. The terminal includes a switch operation unit 14, which is operated by the user to instruct the reception switch unit 13 to switch the operation.

The control procedure performed by the terminal 1 with the structure shown in FIG. 8 will now be described.

Figure 10:
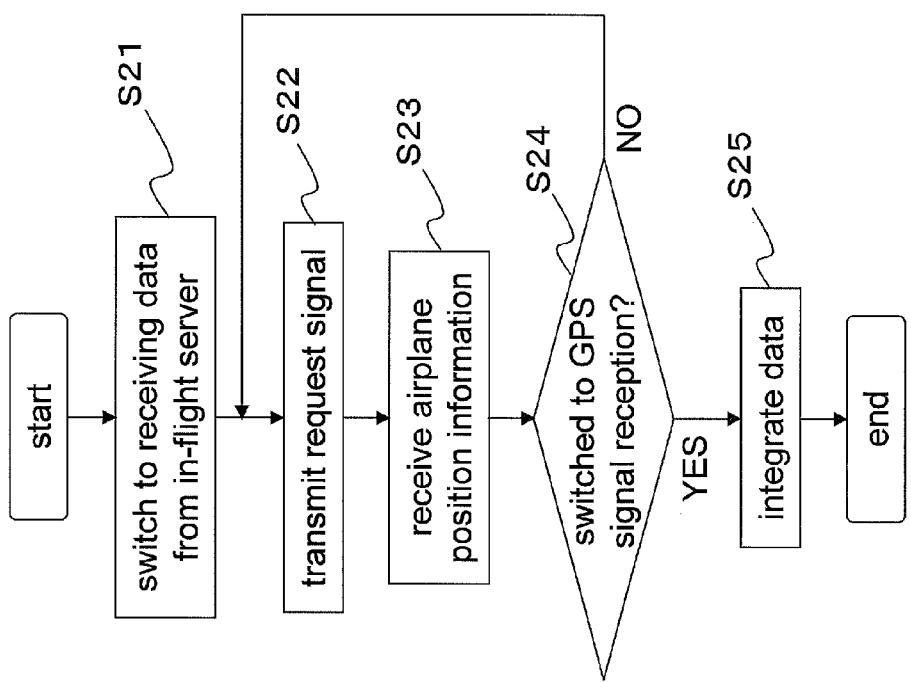
FIG. 10 is a flowchart showing the control performed by the terminal shown in FIG. 9.

FIG. 10 is a flowchart showing the control processing performed by the terminal 1 of the present embodiment.

Before the user of the terminal 1 enters the airplane 3, as shown in FIG. 2, the user downloads the communication software A4 in advance from the external server 4 into the terminal 1.

As shown in step S21 in FIG. 10 (switch step), after entering the airplane 3, the user operates the switch operation unit 14 to activate the reception switch unit 13. This switches from receiving the GPS signals with the GPS signal reception unit 11 to receiving the in-flight data with the in-flight server data communication unit 12.

After this switching, as shown in step S22 (request step), a request signal A2 for airplane positional information is transmitted regularly from the in-flight server data communication unit 12 to the in-flight server 31 via the wireless access point 30.

In the airplane 3, as shown in FIG. 2, the current position is constantly calculated by the position detecting unit 32 using, for example, GPS signals A1 from the GPS satellites 2, radio waves from the terrestrial aviation wireless facilities, and signals from the stationary satellites. The calculated current positions are sequentially stored into the in-flight server 31 together with the corresponding timestamps.

In response to the request signal A2, as shown in step S23 (moving object information obtaining step), the in-flight server 31 transmits the airplane positional information A3 to the in-flight server data communication unit 12 via the wireless access point 30.

In step S24, it is determined whether the operation has been switched from receiving the airplane positional information A3 with the in-flight server data communication unit 12 to receiving the GPS signals A1 with the GPS signal reception unit 11. More specifically, the request signal A2 is transmitted regularly and the airplane positional information A3 is received in response to the request signal until the user operates the switch operation unit 14 to switch the operation to receiving the GPS signals A1 with the GPS signal reception unit 11. The airplane positional information A3 transmitted sequentially is stored sequentially into the second storage unit 16. In the airplane, the user may operate the switch operation unit 14 to display the airplane positional information, which is stored sequentially into the second storage unit 16, together with a map on the display 18.

When it is determined that the operation has been switched to receiving the GPS signals A1 with the GPS signal reception unit 11 in step S24, the airplane positional information A3 stored in the second storage unit 16 is integrated with the positional information stored in the first storage unit 15 in step S25 (integration step). In other words, the terminal 1 uses the airplane positional information A3 obtained from the airplane 3 as the positional information of the terminal 1.

The user can display, on the display 18, his or her movement log including the movement of the airplane 3, together with the positional information stored in the first storage unit 15.

In this case, while the airplane positional information A3 in minutes is being received, the GPS signals are not received by the GPS signal reception unit 11 of the terminal 1. The airplane positional information A3 received in minutes is all integrated with the positional information of the terminal 1.

The above operation shown in FIG. 10 is first switched to receiving with the GPS signal reception unit 11 in step S24, and then the airplane positional information stored in the second storage unit 16 is integrated with the positional information stored in the first storage unit 15. However, the embodiment should not be limited to this structure and this operation. For example, the airplane positional information sequentially stored into the second storage unit 16 may be sequentially integrated with the positional information stored in the first storage unit 15 before the operation is switched to receiving the signal with the GPS signal reception unit 11.

(D) In the above embodiment, the terminal is connected to the wireless access point 30. Alternatively, the terminal may be connected to a seat monitor or a handset included in the In-Flight Entertainment (IFE) system in the airplane 3. In this case, the terminal is connected to the in-flight server via the seat monitor or the handset. The terminal may be connected with near field communication such as NFC, BLUETOOTH®, or with wired connection such as connection using a universal serial bus (USB). The information about the airplane may be transmitted from the in-flight server to the seat monitor or the handset. The terminal may then obtain the information about the airplane from the seat monitor or the handset. This prevents many access request signals from being transmitted from the terminal to the in-flight server at one time, and thus prevents delays in responses.

(E) In the above embodiment, positional information is accumulated in a predetermined period (while the terminal is in the airplane 3). For example, positional information is accumulated from the position of boarding to the position of getting off. When the operation instruction unit 41 is operated at the arrival, the accumulated positional information is then transmitted collectively to the terminal 1 as the positional information stored in the in-flight server 31. However, the airplane positional information A3 may not be accumulated until the arrival of the airplane 3, but the airplane positional information A3 accumulated up to the current position may be obtained during the movement. In formats such as GPX and KML, positional information indicating a plurality of positions can be described as one set of data together with the corresponding time information. The communication software A4 may be downloaded from the in-flight server 31, instead of being downloaded from the external server 4. This eliminates the need for installing the software in the terminal in advance, and allows the software to be set usable after the user enters the moving object. Alternatively, the communication software A4 may be preset in the terminal 1 and provided to the user. This allows the software to be used without the burden of downloading the software.

Figure 11:
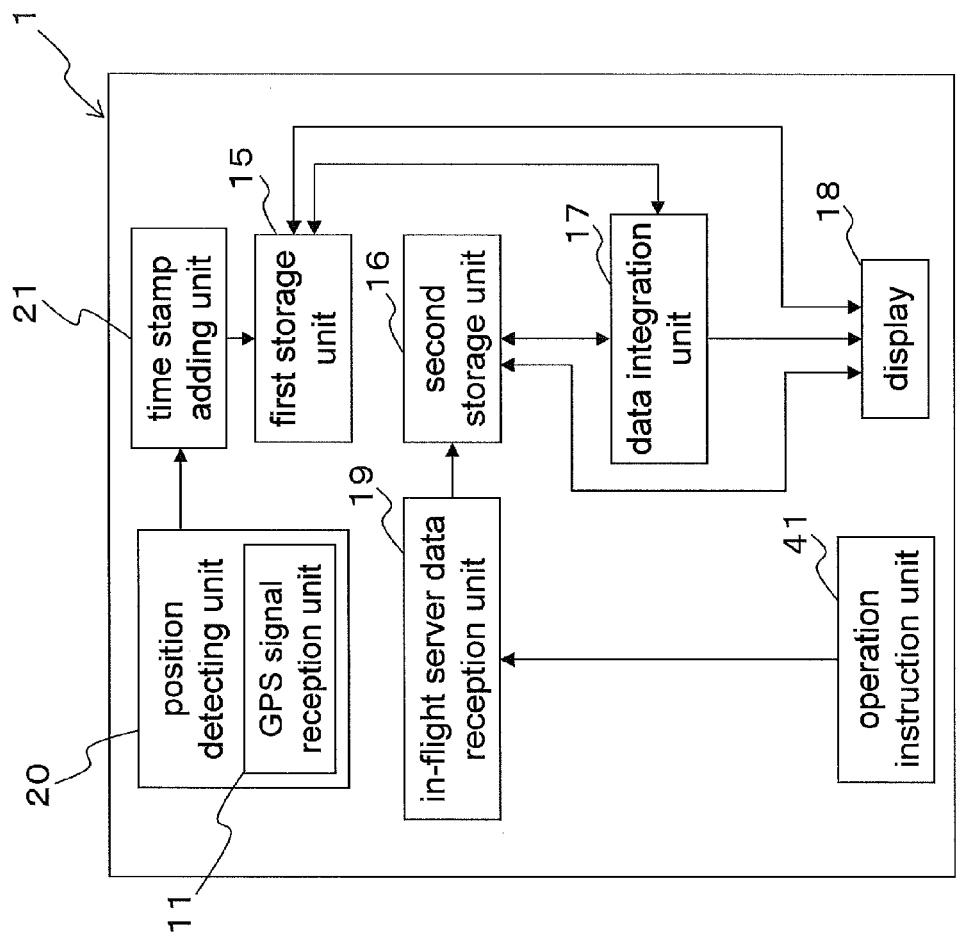
FIG. 11 is a block diagram showing the structure of a terminal according to a modification of the first embodiment.

The switching may be triggered when the terminal 1 is switched to the in-flight mode, instead of being triggered when the operation instruction unit 41 is operated. In the above embodiment, the terminal 1 includes the in-flight server data communication unit 12. The information about the moving object is transmitted from the in-flight server 31 in response to the request signal A2 from the terminal 1. Alternatively, the information may be transmitted from the in-flight server 31 without the request signal A2 (push distribution). For example, the information may be broadcasted on the network in the airplane 3 to allow any terminal to receive the information. In this case, the in-flight server data communication unit 12 may eliminate its function of transmitting the request signal A2, and is only required to have the function of receiving at least the information about the moving object. More specifically, in the above embodiment, the terminal includes the in-flight server data communication unit 12 as an example of a second information obtaining unit. As shown in the block diagram of FIG. 11, the terminal may include an in-flight server data reception unit 19 (an example of a second information obtaining unit), which receives information about the moving object, instead of the in-flight server data communication unit 12.

Figure 12:
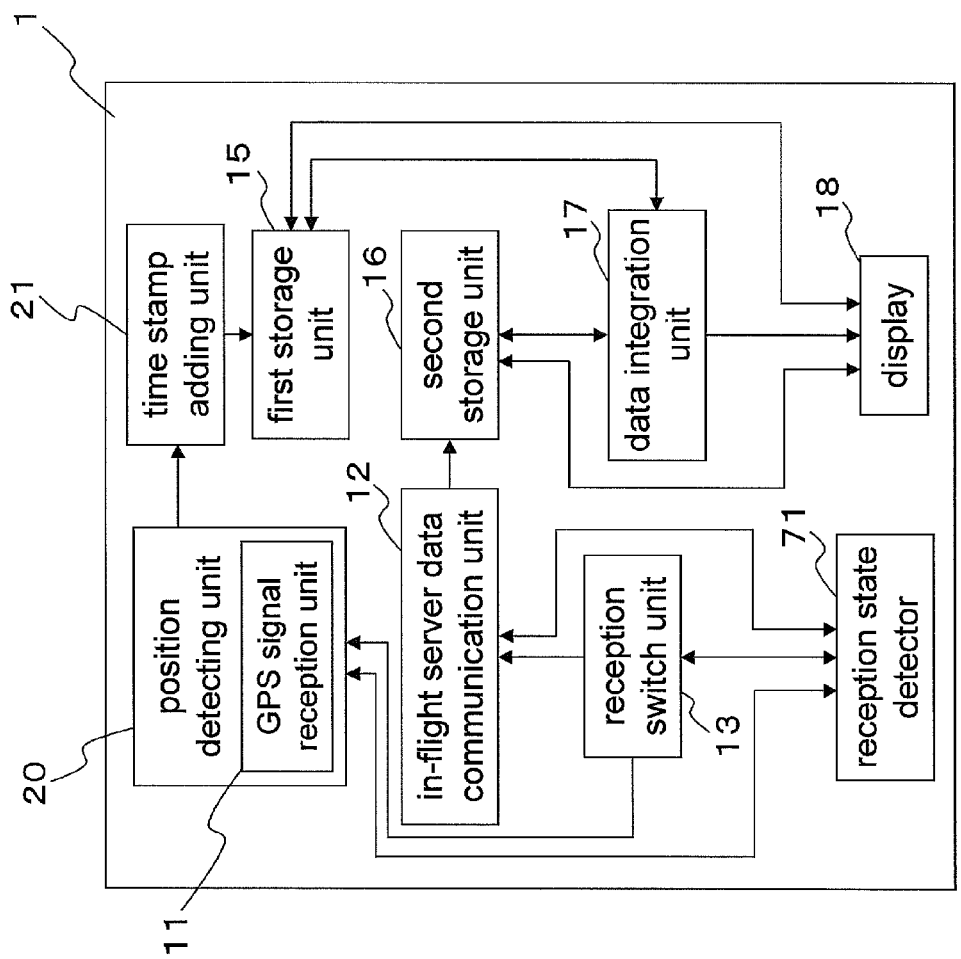
FIG. 12 is a block diagram showing the structure of a terminal according to a modification of the first embodiment.

(F) In the above embodiment, the user operates the switch operation unit 14 to instruct the reception switch unit 13 to switch the operation from receiving with the GPS signal reception unit 11 to receiving with the in-flight server data communication unit 12. Alternatively, the operation may automatically switch to receiving with the in-flight server data communication unit 12 when the incapability of receiving GPS signals is detected. FIG. 12 is a block diagram showing the structure of the terminal 1 in this case. The terminal 1 shown in FIG. 12 includes a reception state detector 71, which detects the reception states of the GPS signal reception unit 11 and the in-flight server data communication unit 12, instead of the switch operation unit 14 shown in FIG. 9.

For example, when the user enters the airplane 3 and the reception state of the GPS signals from the GPS signal reception unit 11 deteriorates, the reception state detector 71 detects the deteriorating reception state, and transmits a reception switch command to the reception switch unit 13. In response to the reception switch command, the reception switch unit 13 again switches the operation from receiving with the GPS signal reception unit 11 to receiving with the in-flight server data communication unit 12.

When the user gets off the airplane 3, the reception state of the in-flight server data communication unit 12 deteriorates, and the reception state detector 71 detects the deteriorating reception state. The reception state detector 71 transmits a reception switch command to the reception switch unit 13. In response to the reception switch command, the reception switch unit 13 switches the operation from receiving with the in-flight server data communication unit 12 to receiving with the GPS signal reception unit 11.

The reception switch unit 13 may switch the operation by determining the position of the airport by using the positional information detected by the terminal 1 at the outside 5 of the airplane based on the GPS signal. Alternatively, the reception switch unit 13 may switch the operation when the terminal 1 detects the wireless AP30 in the airplane 3.

(G) In the above embodiment, the terminal 1 includes the display 18. Alternatively, the display 18 may be eliminated. More specifically, the terminal 1 should not be limited to a mobile phone such as a smartphone, but may be any terminal that can at least obtain information about a moving object. In this case, for example, the terminal may store the obtained information, which may then be analyzed by using, for example, a personal computer. The obtained information may also be transferred to a personal computer. The terminal 1 is only required to be capable of obtaining information about a moving object, and may not be a mobile phone but may be, for example, a watch. The terminal 1 may not have other functions such as the functions of a watch and a telephone.

(H) In the present embodiment, the positional information is displayed on the display. Alternatively, information other than the positional information, such as information about the switching state of the reception switch unit, information indicating whether a signal has been received from the in-flight server, and information indicating whether the reception is successful may be displayed.

(I) In the above and other embodiments, the operation instruction unit 41 and the switch operation unit 14 are touch panels. Alternatively, the operation instruction unit 41 and the switch operation unit 14 may be, for example, buttons. The switching operation may be triggered when wireless connection (e.g., WiFi or NFC) becomes available.

(J) In the above embodiment, the terminal is a wireless terminal in one example. Alternatively, the terminal may use wired connection, such as connection using a USB.

(K) In the above embodiment, the in-flight server data reception unit 12 obtains information about the moving object from the in-flight server 31. When wireless connection such as WiFi and wired connection such as a USB are available to the terminal 1, the terminal 1 may use the wireless connection function.

(L) All or part of the processes performed by the terminal according to the above embodiment may be implemented by using a program. All or part of the processes performed by the terminal according to the above embodiment may be implemented by a central processing unit (CPU) of a computer. The program operates in cooperation with the computer.

The program may be recorded onto a computer readable storage medium such as a read-only memory (ROM), or may be transferred via a transfer medium such as the Internet, or via a transfer medium such as light or radio waves, and may be read by a computer. For example, the terminal 1 according to the above embodiment may be connected to the Internet wirelessly or with wires, and the program implementing the above processes may be transferred via the Internet. The computer should not be limited to hardware such as a CPU, but may be firmware or an operating system (OS). All or part of the processes, procedures, and steps implemented by the information reading method according to the above embodiment may be implemented by using either hardware or software, or may be implemented by using both software and hardware.

Second Embodiment

A terminal according to another embodiment of the disclosure will now be described with reference to FIGS. 13 to 18.

1. Structure 1-1 Terminal 101

Figure 13:
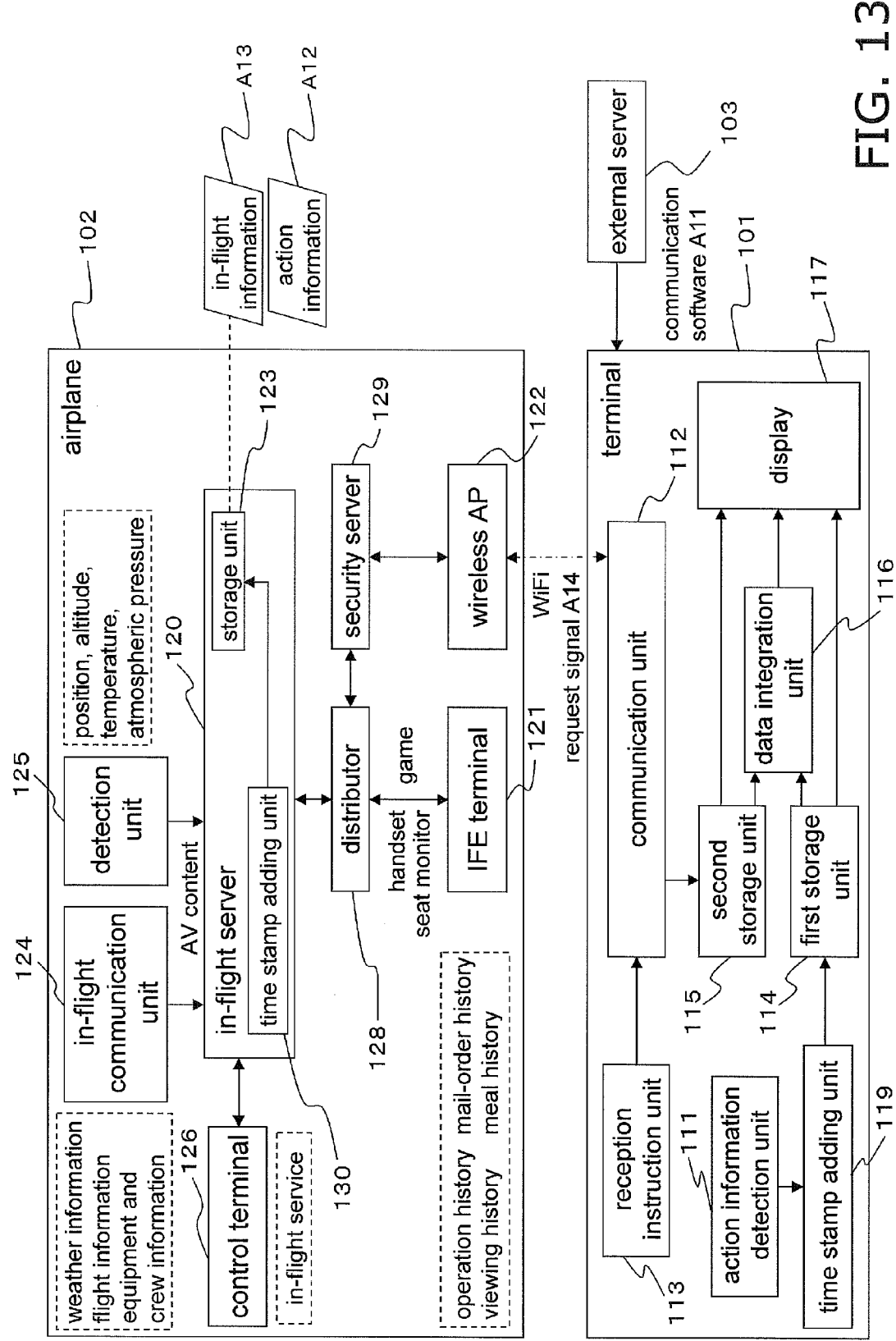
FIG. 13 is a block diagram showing the structure of a communication system according to a second embodiment.

FIG. 13 is a block diagram showing the control performed by a communication system including a terminal 101 according to the present embodiment.

As shown in FIG. 13, the terminal 101 of the present embodiment communicates with an airplane 102 and an external server 103.

The terminal 101 of the present embodiment is, for example, a portable wireless terminal, such as a smartphone. As shown in FIG. 13, the terminal 101 includes an action information detection unit 111 (an example of an action information detection unit), a communication unit 112 (an example of a second information obtaining unit), a reception instruction unit 113, a first storage unit 114, a second recording unit 115, a data integration unit 116 (an example of an integration unit), a display 117, and a time stamp adding unit 119.

Figures 14A, 14B:
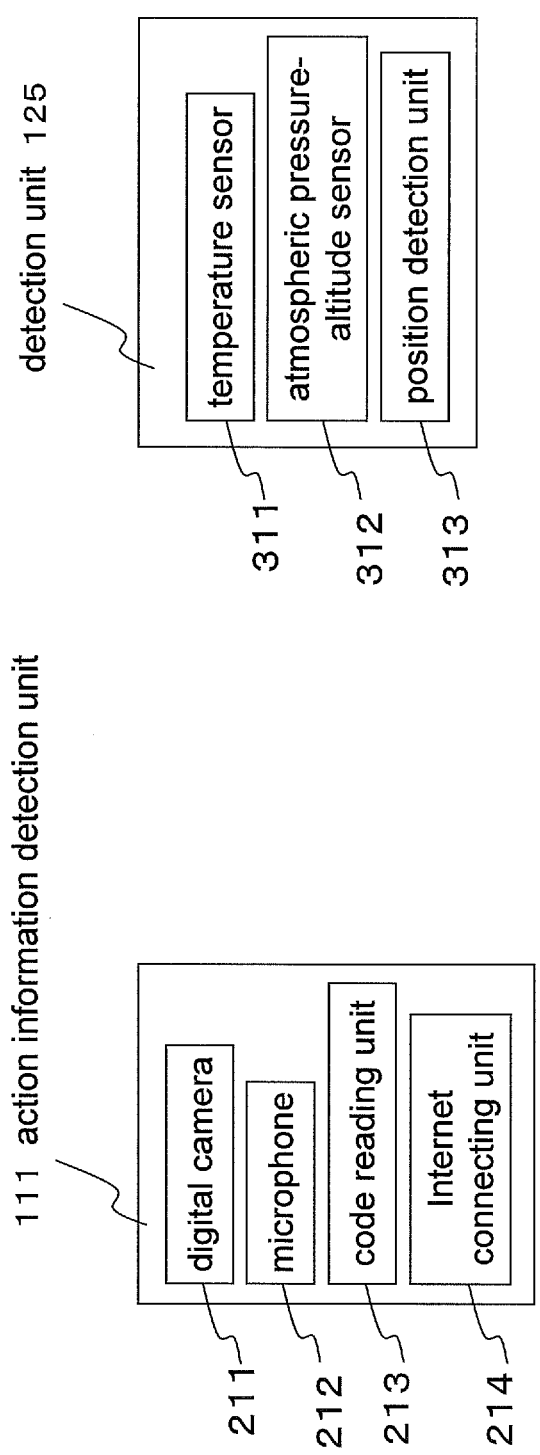
FIG. 14A is a block diagram showing the structure of an action information detection unit included in the terminal shown in FIG. 13.
FIG. 14B is a block diagram showing the structure of a detection unit included in the airplane shown in FIG. 13.

FIG. 14A is a block diagram showing the structure of the action information detection unit 111. As shown in FIG. 14A, the action information detection unit 111 includes sensors for recording information about the actions of a user. More specifically, for example, the action information detection unit 111 includes a digital camera 211, a microphone 212, a code reading unit 213, and an Internet connecting unit 214. The code reading unit 213 can read information such as a barcode and a two-dimensional code, and uses the function of the digital camera 211. The Internet connecting unit 214 enables wireless or wired connection to the Internet.

The time stamp adding unit 119 adds timestamps to action information detected by the various sensors of the action information detection unit 111.

The first storage unit 114 stores action information obtained by the various sensors of the action information detection unit 111, which is recorded together with the corresponding timestamps.

The communication unit 112 receives action information A12 of the user and in-flight information A13 of the airplane 102, which are stored in the airplane 102 (described in detail later). The second storage unit 115 records the received action information of the user.

The reception instruction unit 113 instructs the communication unit 112 to receive action information transmitted from the airplane 102 together with the added timestamps. In the present embodiment, the terminal 101 may be a smartphone, which includes a display 117, such as an LCD screen. The reception instruction unit 113 may be, for example, a touch panel that is integrally incorporated in the display 117.

The data integration unit 116 integrates the user action information stored in the first storage unit 114, and the user action information A12 and the in-flight information A13 stored in the second storage unit 115. The display 117 may display the integrated information.

1-2 Airplane 102

The structure of the airplane 102 that communicates with the terminal 101 of the second embodiment will now be described. The airplane 102 is an example of a moving object.

As shown in FIG. 13, the airplane 102 includes an in-flight server 120, IFE (In-Flight Entertainment) terminals 121, wireless access points (hereafter, wireless APs) 122, an in-flight communication unit 124, a detection unit 125, and a control terminal 126.

Figure 15:
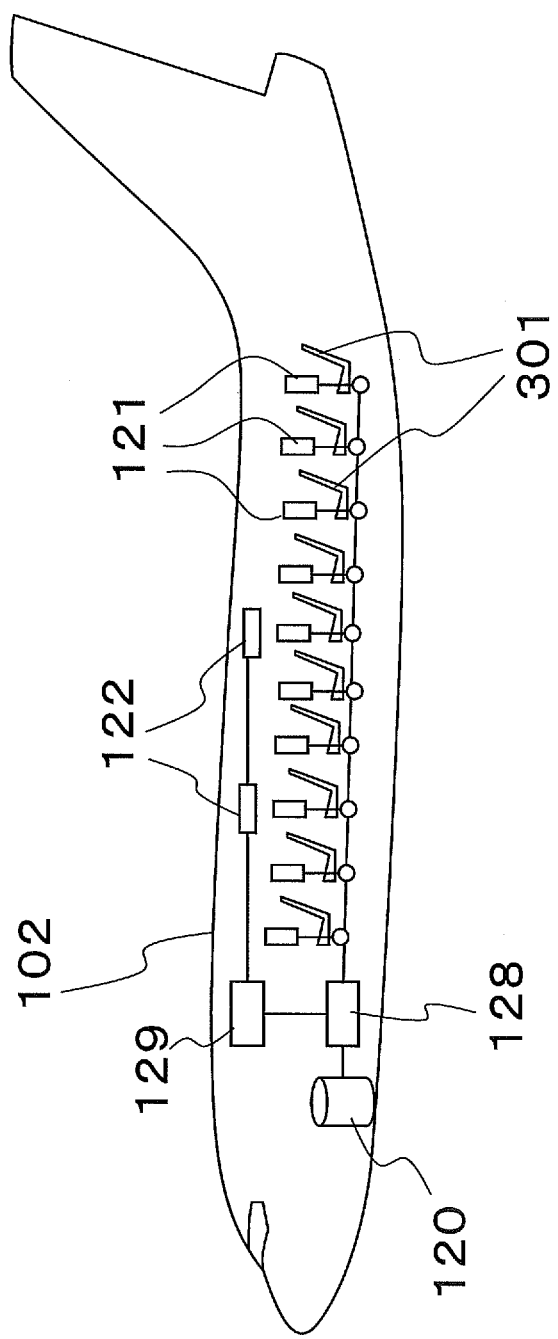
FIG. 15 is a block diagram showing the structure of the airplane shown in FIG. 13.

As shown in FIG. 15, using the in-flight entertainment (IFE) system is an example of the action of the user in the airplane 102. FIG. 15 is a block diagram partially showing the structure of a communication system in the airplane 102.

As shown in FIGS. 13 and 15, the in-flight server 120 and the IFE terminals 121 in the airplane 102 are connected to each other with a distributor 128.

As shown in FIG. 13, the in-flight server 120 includes a time stamp adding unit 130 and a storage unit 123, and stores AV content such as movies and music. The IFE terminal 121 is arranged on every seat 301 (refer to FIG. 15), and includes a handset, a seat monitor, and the like. The seat monitor of the IFE terminal 121 may be a touch panel. The user operates the seat monitor to view his or her intended AV content read from the in-flight server 120 onto the seat monitor via the distributor 128.

The airplane 102 includes a plurality of wireless access points (hereafter, APs) 122, which allow wireless communication with the terminal 101 carried into the airplane 102. The wireless APs 122 are connected to the distributor 128 via a security server 129.

The in-flight communication unit 124 communicates with external sources, and obtains weather information, flight information, and equipment and crew information.

FIG. 14B is a block diagram showing the detection unit 125 included in the airplane 102. As shown in FIG. 14B, the detection unit 125 includes a temperature sensor 311, an atmospheric pressure-altitude sensor 312, and a position detecting unit 313. The detection unit 125 detects the position and the altitude of the airplane 102, and the temperature or the atmospheric pressure inside or outside the airplane 102. The position detecting unit 313 detects the position based not only on GPS signals from the GPS satellites but also on radio waves emanating from the aviation wireless facilities and signals from the stationary satellites, and further based on movement calculations performed using an accelerator and a gyroscope.

The control terminal 126 provides in-flight services, such as in-flight broadcasting.

The storage unit 123 stores the action information A12 including an operation history of the IFE terminal 121, a viewing history, a mail-order history, and a meal history, and the in-flight information A13 obtained by the in-flight communication unit 124, the detection unit 125, and the control terminal 126 together with the corresponding timestamps.

1-3 External Server 103

As shown in FIG. 13, the external server 103 is installed by, for example, an airline company. The external server 103 stores communication software A11, which enables communication with the wireless APs 122 set in the airplane 102. The terminal 101 downloads the communication software A11 stored in the external server 103 through the Internet to enable communication with the in-flight server 120 via the wireless APs 122. Such wireless connection may be performed by using, for example, WiFi or NFC.

2. Operation 2-1. Storing Information in the Airplane 102

The operation of storing information in the airplane 102 will now be described.

The airplane 102 adds timestamps to the action information of the user, such as information about the operation history of the IFE terminal 121, and the in-flight information, such as flight information and equipment and crew information, and stores the action information and the in-flight information in the storage unit 123.

The information stored in the airplane 102, or specifically the user action information and the in-flight information, will now be described separately.

2-1-1. User Action Information

Examples of the user action information include information about the viewing history of AV content using the IFE terminal 121, the mail-order history of, for example, in-flight sales, and the access history of content on the Internet or information representing the content.

More specifically, when the user operates the touch panel of the IFE terminal 121 to view AV content stored in the in-flight server 120, information about the viewing history is recorded into the storage unit 123 together with the timestamp. When the user operates the seat monitor of the IFE terminal 121 to purchase from in-flight sales, information about the purchasing history is recorded into the storage unit 123 together with the timestamp. When the user operates the seat monitor of the IFE terminal 121 to connect to, for example, the Internet, the content or information representing the content is recorded into the storage unit 123 together with the timestamp via the in-flight server 120.

Examples of the user action information include information about the menu of a meal, information about games played on the monitor or the handset, and information about the time at which the monitor or the handset is operated. This history of operation performed by the user is stored into the storage unit 123 together with the corresponding timestamps.

The information about the menu of a meal of the user in the airplane 102 is obtained in the manner described below. Typically, two different meals are often available in the airplane 102. The selection of the user for one of the meals is recorded into the in-flight server 120 for every seat number together with the timestamp. The user can subsequently obtain his or her record of action by inputting the seat number. The terminal 101 can thus obtain information about the menu of the meal from the in-flight server 120 together with the timestamp. The information may be recorded into the in-flight server 120 by the control terminal 126 or may be recorded when the user selects one of the meals by operating the IFE terminal 121.

This allows the information about the meal to be recorded easily without requiring a manual input of such information. Additionally, information held by the meal provider, such as information about ingredients of each meal, areas of production of these ingredients, and calories of each meal, and the supplier of each meal, may be recorded as the in-flight information (described below). This allows the user to be provided with detailed information about the meal.

2-1-2. In-flight Information

The airplane 102 stores information about the flight as in-flight information (an example of information about a moving object). The in-flight communication unit 124 installed on the airplane 102 obtains the information about the flight including the names of departure and arrival airports, the name of equipment, the flight identification number, information about cabin attendants, the place of departure, the place of arrival, and weather information on the scheduled flight route. The airplane 102 stores the obtained information into the storage unit 123 via the in-flight server 120. The airplane 102 further stores information that changes during flight, including information about the position, altitude, air temperature, and atmospheric pressure detected by the detection unit 125, and information about the departure time, the flight route, and the arrival time, and the information about meals described above including calories, ingredients, and production places of the ingredients into the storage unit 123.

The in-flight control terminal 126 obtains information about guidance given by cabin attendants including the contents and the time of the guidance, and stores the obtained information into the storage unit 123.

Such in-flight information is associated with the action information and stored into the storage unit 123. For example, when the user entering the airplane 3 is seated and operates the IFE terminal 121 installed on the seat, action information indicating the seating is stored into the storage unit 123 together with the timestamp. In association with the action information indicating the seating, the information about the flight including the names of departure and arrival airports, the scheduled departure time, the scheduled arrival time, the name of equipment, and the flight identification number is stored into the storage unit 123.

2-2. Terminal 101 Obtaining Information from Airplane 102

An example of a method for obtaining information by the terminal 101 of the present embodiment will now be described.

Figure 16:
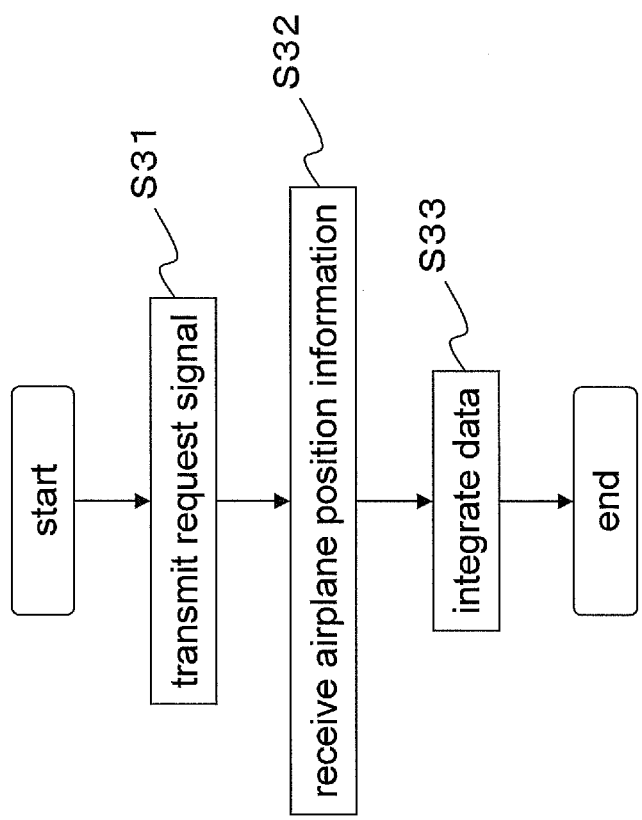
FIG. 16 is a flowchart showing the control performed by the terminal shown in FIG. 13.

FIG. 16 is a flowchart showing the control performed by the terminal 101 of the present embodiment.

Before the user of the terminal 101 enters the airplane 102, the user downloads the communication software All in advance from the external server 103 into the terminal 101 as shown in FIG. 13.

After the user enters the airplane 102, the user operates the IFE terminal 121 installed on the seat 301, causing action information indicating the seating to be stored into the storage unit 123 together with the timestamp. The action information is tagged with the number identifying the seat 301. Information about the subsequent user operation of the IFE terminal 121, the action information A12 including information about meals, and the in-flight information A13 are sequentially stored into the in-flight server 120 together with the corresponding timestamps. The action information A12 tagged for each individual user, which is stored in the storage unit 123, is identified with the seat number. In other words, the action information A12 of each individual user is recorded for every corresponding seat number.

In step S31, when the user operates the reception instruction unit 113 at landing of the airplane 102, a reception instruction is transmitted to the communication unit 112. When operating the reception instruction unit 113, the user inputs the seat number to receive the action information A12 of the user tagged with the seat number and the in-flight information A13.

As shown in step S31, a request signal A14 (refer to FIG. 13) is transmitted from the communication unit 112 to the wireless AP 122. The request signal A14 is transmitted to the in-flight server 120 via the wireless AP 122, the security server 129, and the distributor 128.

As described above, the user action information A12 tagged with the seat number and the in-flight information A13 in the airplane 102 are stored sequentially into the storage unit 123 of the in-flight server 120.

As shown in step S32, the user action information A12 and the in-flight information A13 (refer to FIG. 13) stored in the storage unit 123, together with the timestamps, are transmitted to the communication unit 112 of the terminal 101 via the distributor 128, the security server 129, and the wireless AP 122. The data format may be, for example, in the form of still images and moving images, eXtensible Markup Language (XML), Text (TXT), and Hypertext Markup Language (HTML). Transmitting the request signal A14 to the in-flight server 120 and receiving the action information A12 and the in-flight information A13 from the in-flight server 120 may use a common protocol for web services, such as Hypertext Transfer Protocol (HTTP). In this case, the action information can be transmitted without requiring an additional dedicated protocol.

The action information A12 and the in-flight information A13 transmitted in the manner described above are stored into the second storage unit 115 together with the timestamps. In the airplane, the user may display the action information A12 and the in-flight information A13 stored in the second storage unit 115 on the display 117. While the action information A12 is being recorded with the IFE terminal 121 of the airplane 102, the action information can also be detected (described later) by the action information detection unit 111 of the terminal 101.

After all the action information A12 stored in the in-flight server 120 of the airplane 102 is received, the action information A12 and the in-flight information A13 stored in the second storage unit 115 are integrated with the action information stored in the first storage unit 114 in step S33. The action information A12 and the in-flight information A13, and the action information stored in the first storage unit 114 have the timestamps. The action information stored in the first storage unit 114 and the action information A12 and the in-flight information A13 stored in the second storage unit 115 are arranged chronologically based on the timestamps when they are integrated together.

The user can display the action information A12 and the in-flight information A13 stored in the in-flight server 120 of the airplane 102 together with the action information stored in the first storage unit 114 in chronological order on the display 117.

A method for obtaining the user action information with the terminal 101 will now be described. The terminal 101 includes a digital camera 211, a microphone 212, a code reading unit 213, and an Internet connecting unit 214. Still images and moving images captured by the digital camera 211, and audio recorded by the microphone 212 are stored into the first storage unit 114. Content accessed by the terminal with the Internet connecting unit 114 or information representing such content, which is for example a URL (uniform resource locator), is stored into the first storage unit 114. Information about a barcode or a two-dimensional code read by the code reading unit 213 is stored into the first storage unit 114.

The action information stored in the first storage unit 114 can be displayed on the display 117. For example, the action information may be displayed in the form of captured images (file names or thumbnail images) or the names of content accessed by the terminal arranged chronologically.

An example of the data integration performed in step S33 will now be described.

FIG. 17A shows the action information stored in the first storage unit 114 of the terminal 101. As shown in FIG. 17A, the timestamp and the action information are stored in pairs. As shown in FIG. 17A, for example, the user plays games on the terminal 101 from 7:58 to 8:01 and powers off the terminal 101 at 8:03. The user powers off the terminal as required when the airplane 102 takes off (described later). The user then powers on the terminal at 8:33 again, and uses schedule management software at 9:20. The user uses a notepad on the terminal 101 at 11:40, and powers off the terminal at 12:20. Subsequently, the terminal 101 is powered on at 12:30, and the reception instruction unit 113 is operated at 12:31. As a result, the terminal 101 receives the user action information A12 and the in-flight information A13 in the airplane 3 via the communication unit 112.

FIG. 17B shows action information stored in the storage unit 123 of the airplane 102. As shown in FIG. 17B, the user is seated at 8:08, and the airplane 102 takes off at 8:23. The in-flight guidance is given by cabin attendants (CAs) at 8:33. The user plays music on the IFE terminal 121 at 8:38. The user calls a CA at 8:50, and views video on the IFE terminal 121 at 9:01. Subsequently, the user selects meal A at 11:30. The in-flight guidance is given by CAs at 12:20. The airplane 102 lands at 12:29. The storage unit 123 further stores flight information that is associated with action information indicating the seating having the timestamp of 8:08. The storage unit 123 further stores the outside temperature that is associated with action information indicating the landing.

FIG. 18 shows a table integrating the action information A12 stored in the terminal 101 shown in FIG. 17A, the action information A12 stored in the airplane 102 shown in FIG. 17B, and the associated in-flight information A13. When data is integrated, information obtained from the airplane 102 is provided with source information for subsequent reference in processing the data. In FIG. 18, the solid circles each indicate positional information obtained from the airplane 102. As shown in FIG. 18, the information is arranged chronologically based on the timestamps. Different pieces of information with the same timestamp are arranged in parallel to each other.

3. Advantages 3-1.

As described above, the terminal 101 in the present embodiment that can be carried into the airplane 102 (an example of a moving object) includes the communication unit 112 (an example of an information obtaining unit). The communication unit 112 obtains, from the airplane 102, the action information A12 of the user of the terminal 101 and the in-flight information A13 in the airplane 102.

When, for example, the user views a movie by using an entertainment system installed on a moving object such as an airplane or installed in a facility such as a library, the user has the burden of directly inputting such action information to record the information. In a moving object or a facility, the user has a burden when recording his or her action performed using the moving object or the facility, in addition to recording with the device carried there. Such information is also difficult to obtain. When using a moving object such as an airplane, the user is required to input information about the moving object, such as information about the surrounding of the moving object accompanying his or her action, such as information about the flight route and the equipment of the airplane. Such recording is difficult to record.

In the terminal 101 of the present embodiment, however, the user action information A12 in the airplane 102 is recorded in the in-flight server 120 of the airplane 102, and thus the user is not required to input information about his or her action into the terminal 101. The action information is thus easy to obtain.

The in-flight information described above may be transmitted to the terminal and recorded on the terminal. During the movement of the airplane 102, various items of information associated with actions can be recorded easily as the action records. The information about the airplane 102 can be used as the travel record, which may be put on the web and shared with other people. In this manner, the information about the airplane 102, which has been difficult to collect, can be collected easily.

3-2.

In the present embodiment, the terminal 101 includes the action information detection unit 111, which obtains the user action information.

This allows not only the action information recorded in the in-flight server 120 in the airplane 102 to be obtained but also action information to be obtained by the terminal 101.

3-3.

In the present embodiment, the terminal 101 includes the data integration unit 116, which integrates the action information obtained by the communication unit 112 with the action information obtained by the action information detection unit 111.

In this case, the user entering the airplane 102 can easily obtain continuous action information without causing discontinuity.

4. Other Embodiments

As described above, although the disclosure has been described based on the embodiment, the disclosure should not be limited to the above embodiment. The disclosure may be modified freely without departing from the spirit and scope of the disclosure.

(A) In the above embodiment, the wireless AP 122 is used as the connection destination of the terminal 101. The connection destination should not be limited to the wireless AP 122. For example, the connection destination may be a handset (not shown) of the IFE terminal 121 in the In-Flight Entertainment (IFE) system in the airplane 102.

Figure 19:
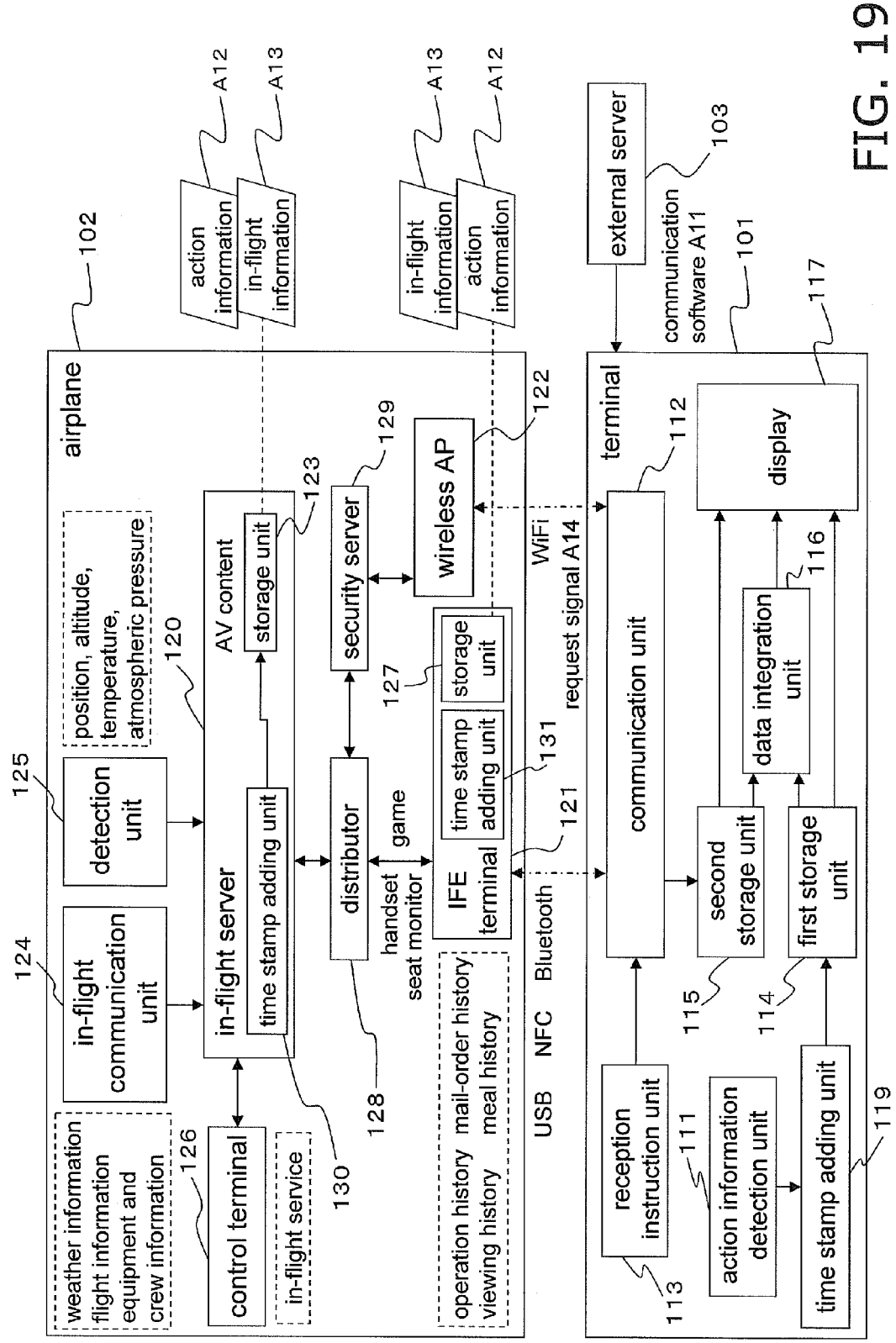
FIG. 19 is a block diagram showing the structure of a communication system according to a modification of the second embodiment.

FIG. 19 is a block diagram showing the structure of a communication system in which the terminal 101 can obtain action information A12 and in-flight information A13 via the IFE terminal 121. As shown in FIG. 19, the terminal 101 can connect to the in-flight server 120 via the IFE terminal 121. This connection may be achieved by using near-distance communication, such as NFC or BLUETOOTH®, or may be wired connection using, for example, a USB.

In FIG. 19, the system includes a wireless AP 122. The communication unit 112 can communicate with both the IFE terminal 121 and the wireless AP 122. Alternatively, when the communication unit 112 can communicate with the IFE terminal 121, the system may eliminate the wireless AP 122.

As shown in FIG. 19, the IFE terminal 121 may include the storage unit 127. The action information A12 and the in-flight information A13 may be transmitted from the in-flight server 120 to the storage unit 123 of the IFE terminal 121. The terminal 101 may obtain the action information A12 and the in-flight information A13 from, for example, the seat monitor or the handset of the IFE terminal 121. This prevents many access request signals from being transmitted from the terminal 101 to the in-flight server 120 at one time, and thus prevents delays in responses.

When the airplane 102 includes both the storage unit 123 and the storage unit 127, the storage unit 127 may store information about the action history of the user of the IFE terminal 121 including information about an operation history, a mail-order history, a viewing history, and a meal history, whereas the storage unit 123 may store in-flight information including weather information, flight information, equipment and crew information, positional information, altitude information, temperature information, atmospheric pressure information, and information about in-flight services. When the information about the action history of the user of the IFE terminal 121 is stored in the storage unit 127, the IFE terminal 121 may include a time stamp adding unit 131 to add timestamps to such action records.

Alternatively, either the action information or the in-flight information may be stored in the storage unit 123 or the storage unit 127. It is only required that the airplane 102 can store the user action information and the in-flight information.

The communication unit 112 may communicate with the IFE terminal 121 to obtain information stored in the storage unit 123 of the in-flight server 120, or may communicate with the wireless AP 122 to obtain information stored in the storage unit 127 of the IFE terminal 121.

(B) In the above embodiment, the terminal 101 obtains both the action information A12 and the in-flight information A13, but may obtain only either the action information A12 or the in-flight information A13. In FIG. 17B, information about the in-flight guidance given by CAs, which requires the user action of hearing, is one item of action information A12. Alternatively, the information about the in-flight guidance by CAs may be one item of in-flight information.

(C) In the above embodiment, the terminal 101 includes the action information detection unit 111 (an example of an information detection unit), which includes the digital camera 211, the microphone 212, the code reading unit 213, and the Internet connecting unit 214. The action information detected by the action information detection unit 111 includes still images and moving images, audio, content, and information representing the content. However, the embodiment should not be limited to this structure. For example, the terminal 101 may include a contactless IC card, and may store action information indicating the use of electronic money.

(D) In the above embodiment, the user action information is tagged with the seat number, and is recorded for every corresponding seat number in the in-flight server 120. Alternatively, the action information may be tagged with information other than the seat number. For example, the user entering the airplane may input his or her name or password when initially using the IFE terminal 121. The history indicating subsequent uses of the IFE terminal 121 may then be tagged with the input name or password. In this case, when the user changes seats, the user is only required to input the previously used same name or password into the IFE terminal 121 so that the user action information can be managed under the same title. The information may be tagged with other information, such as the frequent flyer number, and may be any information that can identify action information for every passenger of the airplane.

(E) In the above embodiment, the airplane 102 is an example of the moving object. The moving object may not be an airplane but may be, for example, a train, a car, or a ship.

The disclosure is applicable not only to the moving object but is also applicable to facilities. In a library, which is an example of such facilities, the user can view DVDs. The viewing history of DVDs may be recorded into a server system of the library as the user action information, and such records may be received by the terminal 101. Further, information about the temperature and the humidity in the library, and the number of visitors (an example of information associated with a facility) may be recorded into the library as in-facility information. Such records may then be received by the terminal 101.

(F) In the above embodiment, the user entering the airplane operates the reception instruction unit 113, and collectively receives the action records of the user stored in the airplane 102 at landing. Alternatively, the user may operate the reception instruction unit 113 in the airplane to receive the action information accumulated up to that time. Alternatively, the user may operate the reception instruction unit 113 after entering the airplane to transmit the request signal A14 regularly.

Figure 20:
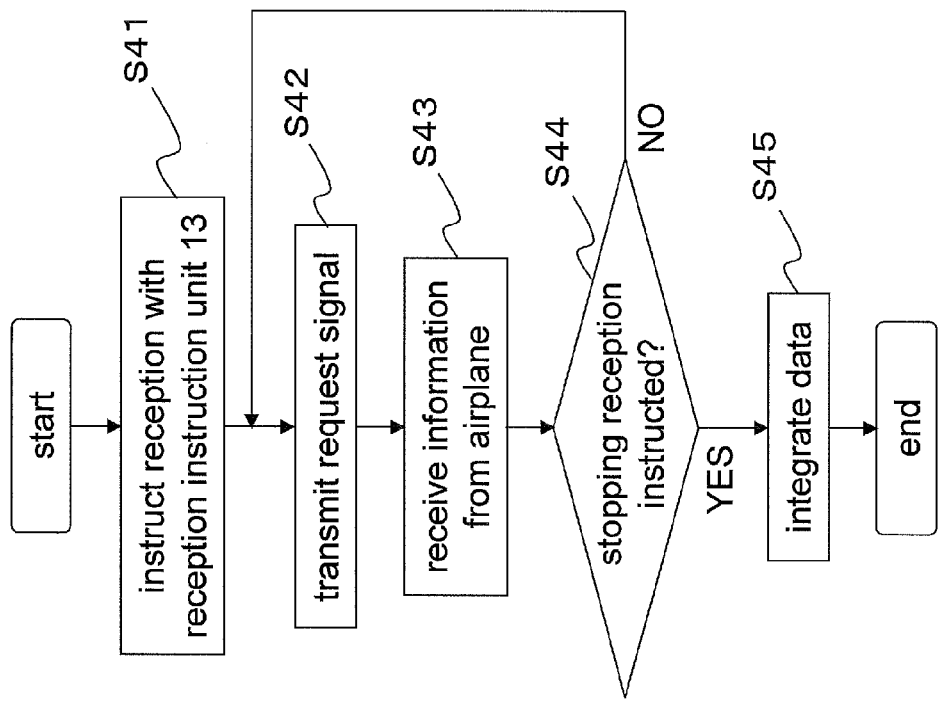
FIG. 20 is a flowchart showing the control performed by the terminal shown in FIG. 19.

FIG. 20 is a flowchart showing the control performed when information is received regularly.

Before the user of the terminal 101 enters the airplane 102, the user downloads the communication software A1 from the external server 103 into the terminal 101 in advance as shown in FIG. 13.

In step S41 (reception instruction step) in FIG. 20, when the user entering the airplane 102 operates the reception instruction unit 113, a reception instruction is transmitted to the communication unit 112. When operating the reception instruction unit 113, the user inputs the seat number to allow the action information A12 tagged with the seat number and the in-flight information A13 to be received subsequently.

In step S42 (request signal transmission step), the request signal A14 (refer to FIG. 13) is transmitted regularly from the communication unit 112 to the wireless AP 122. The request signal A14 is transmitted to the in-flight server 120 via the wireless AP 122, the security server 129, and the distributor 128.

As described above, the user action information A12 and the in-flight information A13, together with the corresponding timestamps, are recorded sequentially into the storage unit 123 of the in-flight server 120 in the airplane 102.

The action information A12 recorded in the storage unit 123 is tagged with the seat number to associate the information with a specific user. More specifically, the user action information A12 is recorded for every seat number.

As shown in step S43 (information obtaining step), the user action information A12 and the in-flight information A13 (refer to FIG. 13) recorded in the storage unit 123 are transmitted to the communication unit 112 of the terminal 101, together with the timestamp, via the distributor 128, the security server 129, and the wireless AP 122.

Subsequently, in step S44 (reception stop determination step), it is determined whether the communication unit 112 has stopped receiving the action information A12 and the in-flight information A13 by an instruction transmitted from the reception instruction unit 113. More specifically, the request signal A14 is transmitted regularly and the action information A12 and the in-flight information A13 are received accordingly until the user operates the reception instruction unit 113 to instruct the communication unit 112 to stop receiving the action information A12 and the in-flight information A13.

The action information A12 and the in-flight information A13, which are transmitted sequentially, are stored sequentially into the second storage unit 115. The user can display the action information A12 and the in-flight information A13, which are sequentially stored into the second storage unit 115 while the user is in the airplane, on the display 117. While the IFE terminal 121 of the airplane 102 is recording the action information A12, the action information detection unit 111 of the terminal 101 can detect the action information in parallel.

When it is determined that the communication unit 112 has stopped receiving the action information, the action information A12 and the in-flight information A13 stored in the second storage unit 115 are integrated with the action information stored in the first storage unit 114 in step S45 (integration step). The action information A12 and the in-flight information A13, and the action information stored in the first storage unit 114 are arranged chronologically based on the timestamps and are integrated together.

The communication software All may be downloaded from the in-flight server 120, instead of being downloaded from the external server 103. This eliminates the need for installing the software into the terminal in advance, and allows the software to be set usable after the user enters the moving object or the facility. Alternatively, the communication software All preset in the terminal 101 may be provided to the user. This allows the software to be used without the burden of downloading the software.

Figure 21:
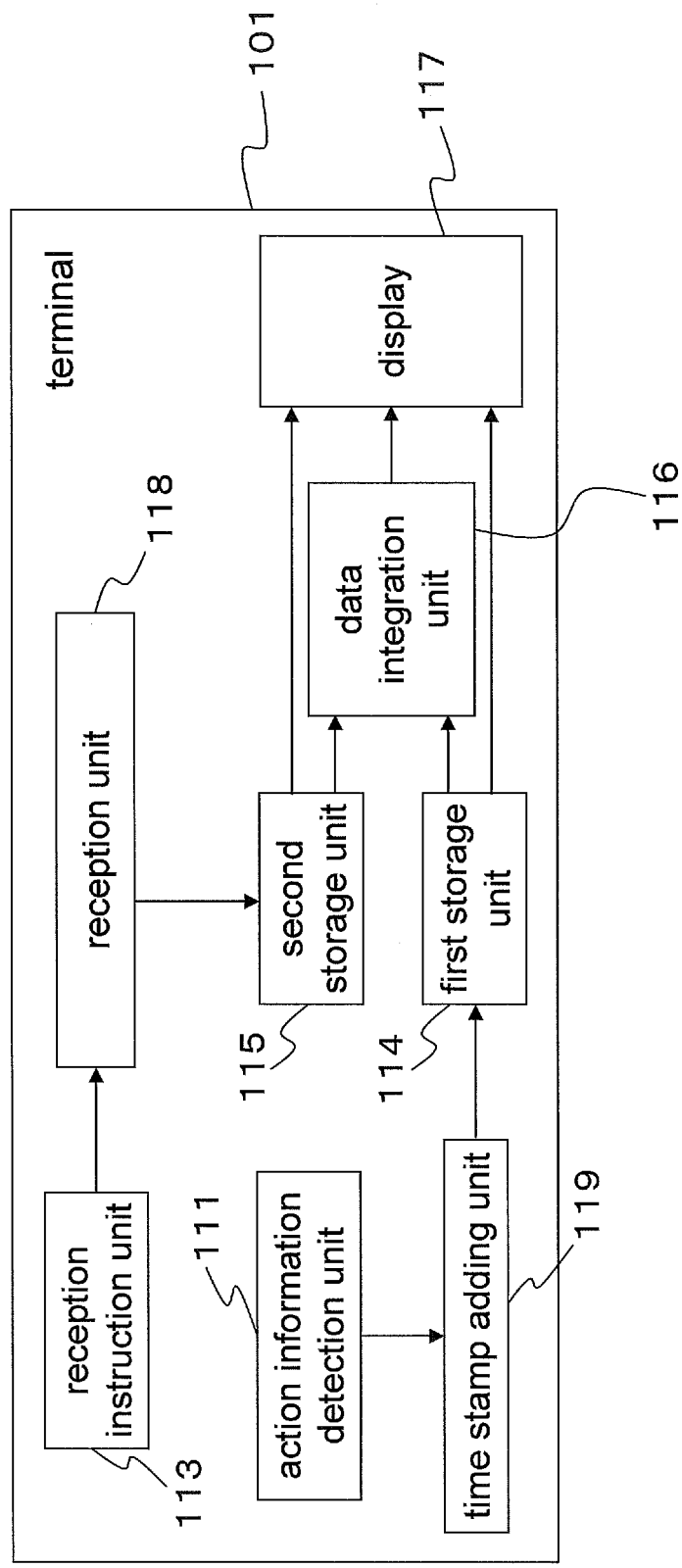
FIG. 21 is a block diagram showing the structure of a terminal according to a modification of the second embodiment.

In the above embodiment, the request signal A14 is transmitted regularly, and the action information is transmitted to the communication unit 112. Alternatively, the action information A12 and the in-flight information A13 may be transmitted from the in-flight server 120 to the terminal 101 registered in advance without the request signal A14 (push distribution). Further, the action of the user (e.g., the use of the seat monitor) or the update of the in-flight information may trigger the transmission of the action information and the in-flight information from the in-flight server 120. In this case, the communication unit 112 may not transmit the request signal A14, or may only receive either the action information or the information about the moving object or the facility at least from the moving object or the facility. More specifically, in the above embodiment, the communication unit 112 is an example of an information obtaining unit. Alternatively, as shown in the block diagram of the terminal 101 in FIG. 21, the terminal may include a reception unit 118 (an example of a second information obtaining unit) instead of the communication unit 112. The reception unit 118 receives the user action information in the moving object or the facility or receives the information about the moving object or about the facility.

(G) The terminal 101 in the above embodiment includes the action information detection unit 111, which is an example of the information detection unit, and the first storage unit 114, which stores the detected action information. Alternatively, the action information detection unit 111 and the first storage unit 114 may be eliminated. It is only required that the terminal 101 includes at least the communication unit 112 as an example of the information obtaining unit, which enables the user action information A12 or the in-flight information A13 in the airplane 102 to be obtained easily.

(H) In the above embodiment, after an instruction to stop reception is transmitted in step S44 in FIG. 20, the action information stored in the first storage unit 114 is integrated with the action information stored in the second storage unit 115. The embodiment should not be limited to this structure and this operation. For example, the action information sequentially stored into the second storage unit 115 before the reception stop instruction is transmitted may be sequentially integrated with the action information stored in the first storage unit 114.

(I) In the above embodiment, the terminal 101 includes the data integration unit 116. Alternatively, the data integration unit 116 may be eliminated. In this case, the received action information is stored in the first storage unit 114 and the second storage unit 115 without data integration. In the terminal 101, the received action information stored in the second storage unit 115 can be retrieved and displayed on the display 117. The action information stored in the first storage unit 114 and the action information stored in the second storage unit 115 may be linked to each other without data integration. This allows the action information stored in the first storage unit 114 and the action information stored in the second storage unit 115 to appear as continuous action information on the display 117.

(J) In the above embodiment, the terminal includes the display 117. Alternatively, the display 117 may be eliminated. More specifically, the terminal 101 may not be a mobile phone such as a smartphone. It is only required that the terminal 101 can obtain action information in a moving object or in a facility and information about the moving object or the facility. In this case, for example, the obtained information may be stored and may be subsequently analyzed by using, for example, a personal computer. The obtained information may be transferred to a personal computer. As described above, the terminal 101 is only required to be capable of obtaining action information in a moving object or in a facility and information about the moving object or the facility. The terminal 101 may not be a mobile phone but may be, for example, a watch. Further, the terminal may not have other functions such as the functions of a watch and a telephone, but may only have the function of obtaining action information in a moving object or in a facility.

(K) In the above embodiment, the display 117 displays the action information. Alternatively, the display 117 may not directly display the action information and the in-flight information, but may display information indicating whether the action information or the in-flight information has been received from the in-flight server, or information indicating whether such reception has been successful or unsuccessful.

(L) In the above embodiment, the reception instruction unit 113 is a touch panel. Alternatively, the reception instruction unit 113 may not be a touch panel, but may be, for example, a button. The reception of the action information may be triggered to activate the communication unit 112 when, for example, wireless connection (e.g., WiFi or NFC) becomes available.

(M) In the above embodiment, the connection to the IFE terminal 121 may not be wireless connection but may be wired connection using, for example, a USB as described above. Alternatively, another connecting unit, other than the IFE terminal 121, may be arranged to enable wired connection.

(N) In the above embodiment, the communication unit 112 obtains the action information of the user in the moving object or the facility from the in-flight server 120. When the terminal 101 has wireless communication functions such as WiFi and wired communication functions such as a USB, such wireless communication functions may be used.

(O) All or part of the processes performed by the terminal according to the above embodiment may be implemented by using a program. All or part the processes performed by the terminal according to the above embodiment may be implement by a CPU of a computer. The program operates in cooperation with the computer.

The program may be recorded onto a computer readable storage medium such as a ROM, or may be transferred via a transfer medium such as the Internet, or via a transfer medium such as light or radio waves, and may be read by a computer. For example, the terminal 101 according to the above embodiment may be connected to the Internet wirelessly or with wires, and the program implementing the above processes may be transferred via the Internet. The computer should not be limited to hardware such as a CPU, but may be firmware or an OS. All or part of the processes, procedures, and steps implemented by the information reading method according to the above embodiment may be implemented by using either hardware or software, or may be implemented by using both software and hardware.

Third Embodiment

A terminal according to another embodiment of the disclosure will now be described with reference to FIGS. 22 to 26.

1. Structure 1-1 Terminal 401

Figure 22:
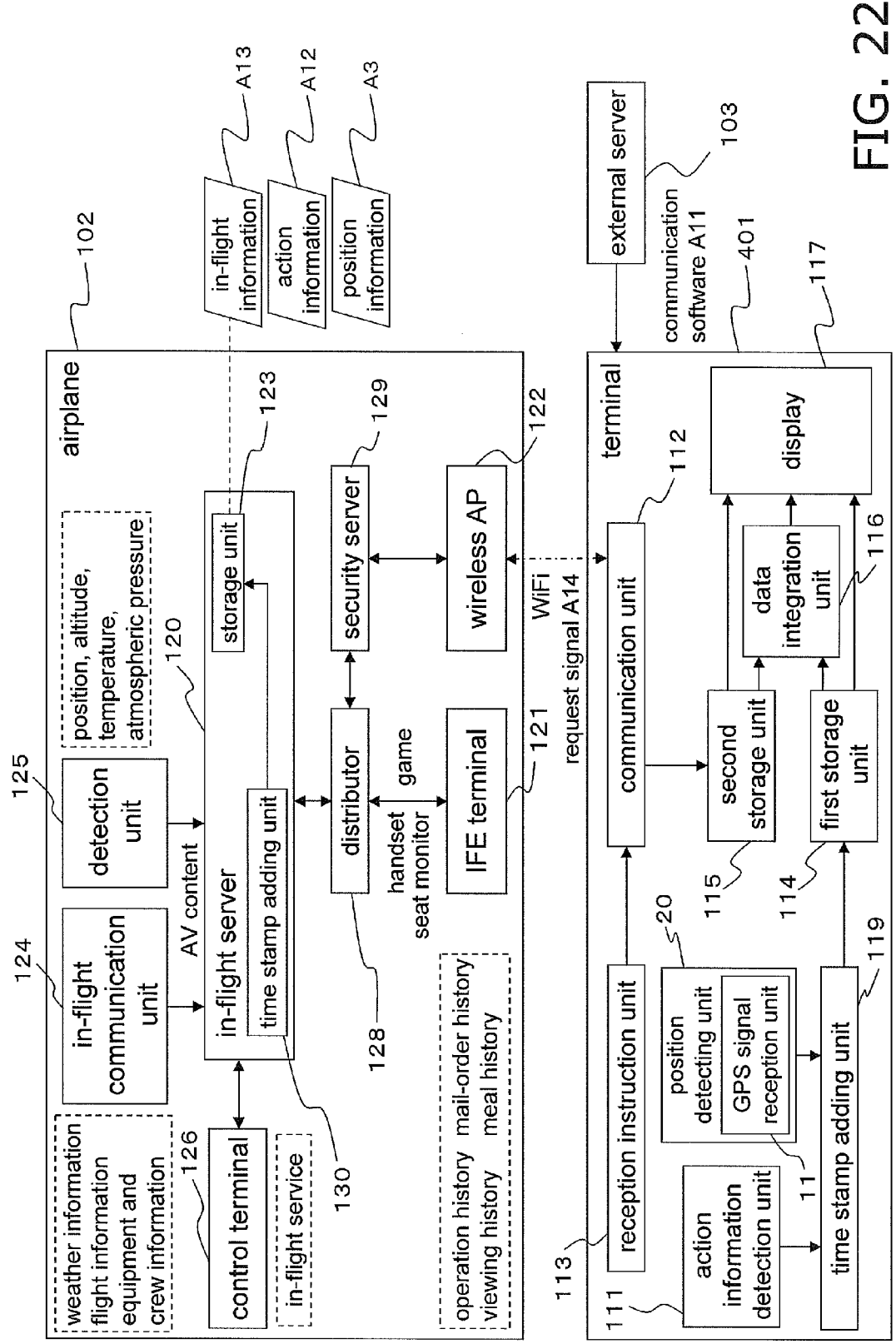
FIG. 22 is a block diagram showing the structure of a communication system according to a third embodiment.

FIG. 22 is a block diagram showing the control performed by a communication system including a terminal 401 according to the present embodiment. The terminal 401 according to the third embodiment has the structure of the terminal 101 of the second embodiment additionally including the position detecting unit 20 described in the first embodiment. In the third embodiment, the components and processes that are the same as described in the first and second embodiments may not be described.

As shown in FIG. 14A, the action information detection unit 111 includes a digital camera 211, a microphone 212, a code reading unit 213, and an Internet connecting unit 214. Unlike the terminal 101, the terminal 401 additionally includes a position detecting unit 20. As shown in FIG. 22, the position detecting unit 20 includes a GPS signal reception unit 11. More specifically, the position detecting unit 20 in the terminal 401 of the present embodiment receives GPS signals with the GPS signal reception unit 11, and detects the current position based on the GPS signals. The time stamp adding unit 119 adds a timestamp to the information, and stores the resulting information into the first storage unit 114. The action information detected by the action information detection unit 111 also has a timestamp, and the resulting information is stored into the first storage unit 114. More specifically, the terminal 401 can record information about the time, position, and actions to allow a lifelog to be captured easily.

1-2 Airplane 102

The airplane 102 shown in FIG. 22 calculates the position based on GPS signals from the GPS satellites (refer to FIG. 2), radio waves emanating from aviation wireless facilities and signals from stationary satellites, and further based on movement calculations performed using an accelerator and a gyroscope. A timestamp is added to information about the calculated position by the time stamp adding unit 130, and the positional information having the timestamp is then stored into the storage unit 123.

As described above, the action information A12 including an operation history of the IFE terminal 121, a viewing history, a mail-order history, and a meal history, and the in-flight information A13 obtained by the in-flight communication unit 124, the detection unit 125, and the control terminal 126 are also stored into the storage unit 123 together with the corresponding timestamps.

More specifically, the position of the airplane 102 and the user action information in the airplane 102 can be stored together with the corresponding times.

2. Operation

The operation of the terminal 401 according to the present embodiment will now be described.

FIG. 23 shows the positional information, the action information, and the timestamps stored in the first storage unit 114. As shown in FIG. 23, the positional information is obtained in minutes. The corresponding action information is also recorded together with the positional information. While the user is in the airplane 102 from 8:21 to 12:29, the positional information of the terminal 401 is not available because the terminal 401 may be powered off or the airplane may be moving at high speed. The user plays games on the terminal 401 from 7:58 to 8:01, and powers off the terminal 401 at 8:20 and powers on the terminal 401 at 8:33. The scheduling function of the terminal 401 is used at 9:20, and the notepad is used at 11:40. The terminal 401 is powered off at 12:20, and is powered on at 12:30 again. The reception instruction unit 113 is operated at 12:31 to receive the action information A12 and the in-flight information A13 stored in the airplane 102.

FIG. 24 shows the timestamps, the positional information, and the action information stored in the storage unit 123 of the in-flight server 120 of the airplane 102. Although the airplane 102 may obtain the positional information and the action information in seconds, the positional information and the action information are associated with each other in minutes. When, for example, the user action of being seated, for which the action information is stored in the storage unit 123, is actually performed at 8:08:23, the action information of the user indicates that the user is seated at 8:08. The positional information Q3 having the timestamp of 8:08:00 is used as the positional information associated with the action information indicating the seating.

Under such conditions, the storage unit 123 of the airplane 102 stores the information shown in FIG. 24, or specifically the airplane positional information from 8:08 to 12:32, information indicating that the user is seated at 8:08, information indicating that the airplane 102 takes off at 8:23, information indicating that the in-flight guidance is given by CAs at 8:33, information indicating that the user plays music on the IFE terminal 121 at 8:38, information indicating that the user calls a CA at 8:50, information indicating that the user plays video on the IFE terminal 121 at 9:01, information indicating that the user selects meal A at 11:30, information indicating that the in-flight guidance is given by CAs at 12:20, and information indicating that the airplane lands at 12:29. The storage unit 123 further stores the in-flight information including flight information, which is associated with the information indicating the seating, and stores information about the calories of meal A, which is associated with the information indicating the selection of meal A, and stores information about the outside temperature, which is associated with the information indicating the landing.

After the airplane 102 lands, the terminal 401 is powered on, and the reception instruction unit 113 is operated to transmit a request signal A14 from the communication unit 112 to the in-flight server 120 of the airplane 102 via the wireless AP 122. In response to the request signal A14, the information about the time, the airplane positional information A3, the action information A12, and the in-flight information A13 associated with the action information A12 are transmitted from the in-flight server 120 to the terminal 401 as shown in FIG. 24. The terminal 401 then stores the received information into the second storage unit 115.

Subsequently, the data integration unit 116 integrates the data. FIGS. 25A and 25B show the integrated data. More specifically, the positional information, the action information, and the in-flight information associated with the action information are arranged chronologically based on their timestamps and integrated together. More specifically, only the positional information that has not been obtained by the terminal 401, selectively from the positional information transmitted from the airplane 102, is integrated with the positional information of the terminal 401. The action information transmitted from the airplane 102 and the action information stored in the terminal 401 are not selected and are all integrated together in the terminal 401. Each piece of information has a flag indicating whether the information has been obtained from the airplane 102. In FIGS. 25A and 25B, the solid circles each indicate positional information obtained from the airplane 102.

3. Advantages 3-1.

As described above, the terminal 401 in the above embodiment that can be carried into the airplane 102 includes the GPS signal reception unit 11, the time stamp adding unit 119, the communication unit 112, and the data integration unit 116. The GPS signal reception unit 11 obtains positional information of the terminal 401. The time stamp adding unit 119 adds a timestamp to the positional information obtained by the GPS signal reception unit 11. The communication unit 112 obtains, from the airplane 102, the positional information of the airplane 102 having timestamps added in the same time unit as the timestamps added by the time stamp adding unit 119. The data integration unit 116 integrates positional information having timestamps for which no positional information has been obtained by the GPS signal reception unit 11, selectively from the positional information obtained by the communication unit 112, with the positional information obtained by the GPS signal reception unit 11.

This allows the terminal 401 to obtain positional information from the airplane 102 to fill the missing positional information that has not been obtained, and thus allows a continuous lifelog to be captured easily.

3-2.

In the above embodiment, the terminal 401 that can be carried into the airplane 102 includes the action information detection unit 111. The time stamp adding unit 119 adds a timestamp to the action information detected by the action information detection unit 111. The communication unit 112 (an example of a second information obtaining unit) obtains, from the airplane 102, the action information of the user of the terminal 401 in the airplane 102 together with the timestamps. The data integration unit 116 (an example of an integration unit) then integrates the action information obtained by the communication unit 112 with the action information detected by the action information detection unit 111 while associating such action information with positional information based on the corresponding timestamps.

This allows the terminal 401 to obtain action information in the airplane 102 easily, and can further associate the information about the time, the positional information, and the action information, and thus allows a lifelog to be captured easily.

4. Other Embodiments

Although the disclosure has been described based on the embodiment, the disclosure should not be limited to the above embodiment, and may be modified without departing from the spirit and scope of the disclosure. The modifications described in the second and third embodiments are also possible.

(A) In the above embodiment, the data integration unit 116 integrates the positional information that has not been obtained by the terminal 401, selectively from the positional information received from the airplane 102. When positional information received by the airplane 102 is available, the positional information received by the terminal 401 may be replaced by the positional information received by the airplane 102. FIGS. 26A and 26B show the integrated data obtained by replacing the positional information received by the terminal 401 with the positional information received by the airplane 102. FIG. 26A and FIG. 26B show the same data as the data shown in FIGS. 25A and 25B except that the positional information from 8:08 to 8:20 and the positional information from 12:30 to 12:32 are replaced by the corresponding positional information obtained by the airplane 102.

As described above, when the timestamp of the positional information obtained by the GPS signal reception unit 11 (an example of a first information obtaining unit) is the same as the timestamp of the positional information obtained by the communication unit 112 (an example of a second information obtaining unit), the positional information obtained by the GPS signal reception unit 11 is replaced by the positional information obtained by the communication unit 112. In this manner, the positional information obtained by the communication unit 112 may be integrated with the positional information obtained by the GPS signal reception unit 11.

This modification should not be limited to the third embodiment, but may be applicable to the first embodiment, in which only the positional information is integrated.

Figure 27:
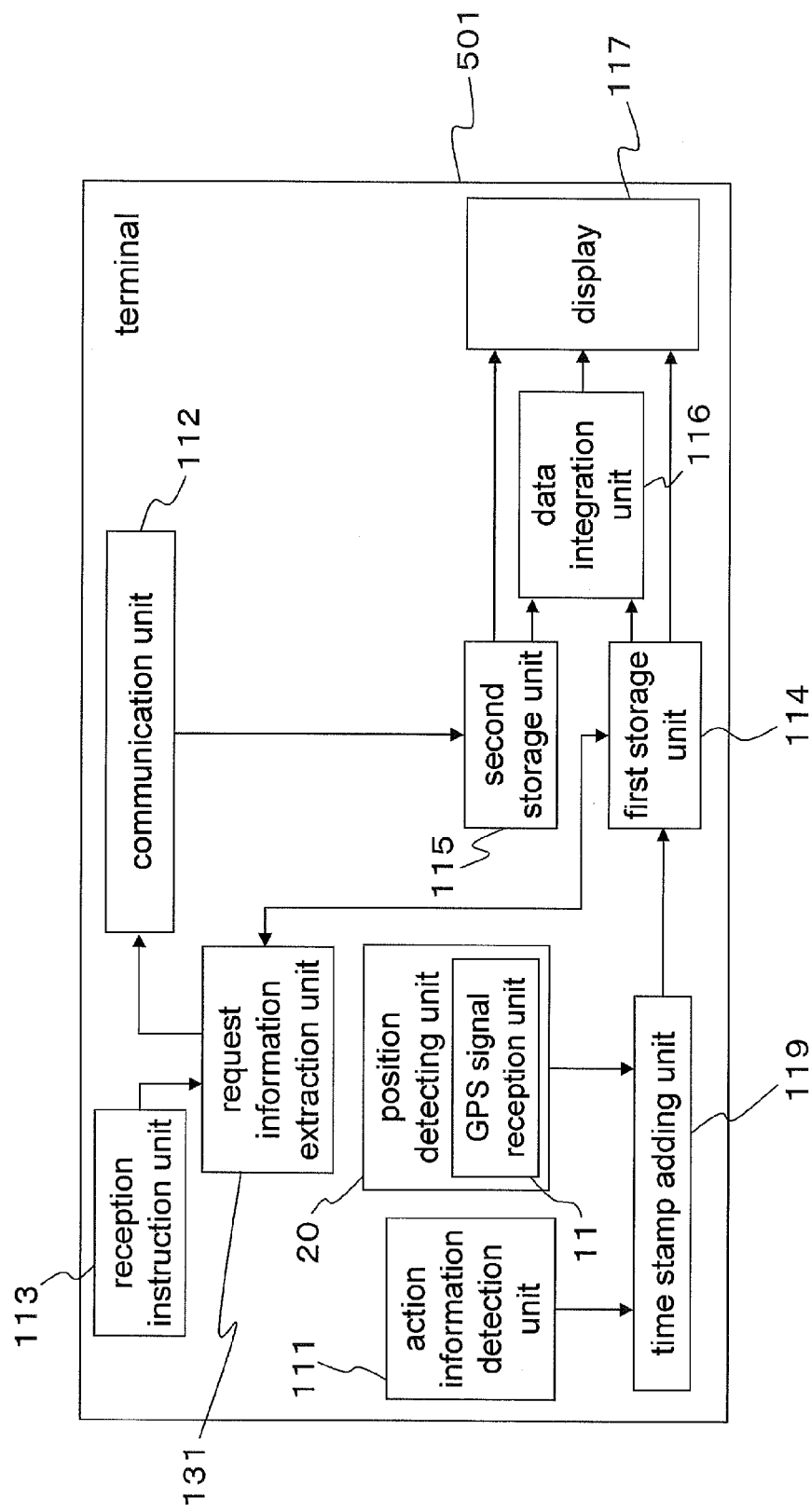
FIG. 27 is a block diagram showing the structure of a terminal according to a modification of the third embodiment.

(B) In the above embodiment, positional information of the airplane 102 having timestamps added in the same time unit as the timestamps added by the time stamp adding unit 119 is obtained from the airplane 102. From the obtained positional information, only the positional information having timestamps for which no positional information has been obtained by the terminal 401 is selectively integrated. Alternatively, the communication unit 112 may transmit a request to the airplane 102 to transmit only the positional information having timestamps for which no positional information has been obtained by the terminal 401. In this case, as shown in FIG. 27, the terminal 501 includes a request information extracting unit 131, which searches the first storage unit 114 and extracts the times for which no positional information is stored in the first storage unit 114. When the reception instruction unit 113 is operated, the request information extracting unit 131 searches the first storage unit 114 to identify positional information that has yet to be obtained. When finding positional information that has yet to be obtained, a request signal is transmitted from the communication unit 112 to the wireless AP 122 (refer to FIG. 22). Identifying positional information that has yet to be obtained is enabled by searching for the timestamps in minutes and determining missing timestamps. A request for information is then transmitted to the airplane 102 to obtain information having the determined missing timestamps.

As described above, the communication unit 112 (an example of a second information obtaining unit) obtains, from the airplane 102, positional information of the airplane 102 having timestamps for which no positional information has been obtained by the GPS signal obtaining unit 11, selectively from the positional information of the airplane 102 having timestamps added in the same time unit as the timestamps obtained by the GPS signal reception unit 11 (an example of a first information obtaining unit). The data integration unit 116 then integrates the positional information obtained by the communication unit 112 with the positional information obtained by the GPS signal reception unit 11.

Figure 28:
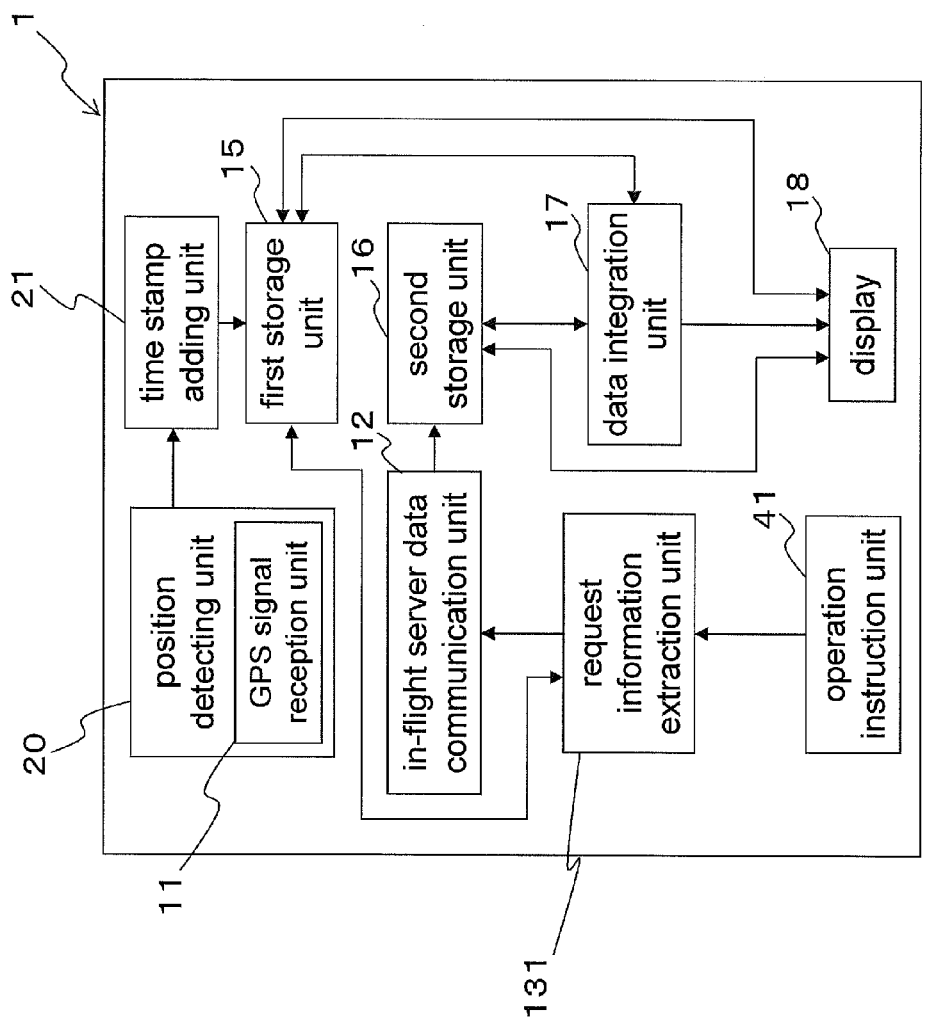
FIG. 28 is a block diagram showing the structure of a terminal according to a modification of the first embodiment.

This modification should not be limited to the third embodiment, and may be applicable to the first embodiment, in which only the positional information is integrated. More specifically, as shown in FIG. 28, the terminal includes a request information extracting unit 131 between the operation instruction unit 41 and the in-flight server data communication unit 12. As instructed by the operation instruction unit 41, the request information extracting unit 131 searches the first storage unit 15 for positional information, and transmits, to the in-flight server data communication unit 12, a request for airplane positional information having the timestamps for which no positional information has been found.

(C) In the above embodiment, the positional information in minutes is obtained by the terminal 401, and thus the positional information in minutes is also obtained from the airplane 102. Alternatively, the positional information in seconds may be obtained by the terminal 401. In this case, it is preferable that the positional information in seconds is obtained from the airplane 102.

(D) In the above embodiment, as shown in FIG. 24, the storage unit 123 of the airplane 102 stores the information about the times, the positional information, and the action information associated with one another based on the timestamps added to the positional information and the action information. Alternatively, the positional information and the action information may be transmitted separately to the terminal 401 with their corresponding timestamps and may be stored in the second storage unit 115.

The positional information may have timestamps obtained in predetermined time units, and the action information may have timestamps corresponding to the times at which the action events occur. The timestamps added to the action information are independent of the predetermined times of the positional information.

In this case, the terminal 401 integrates the positional information and the action information stored in the first storage unit 114 based on the timestamps.

The terminal and the information obtaining method of the disclosure enable information to be obtained correctly or easily in transportation media. The disclosure is widely applicable to, for example, mobile phones.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers, and/or steps. The foregoing also applies to words having similar meanings such as the terms "including," "having," and their derivatives. Further, the terms "part," "section," "portion," "member," and "element" used in singular form may cover not only singular but also plural.

The term "configured" used to describe components, parts, and portions of an apparatus is intended to mean that the apparatus is configured to achieve an intended function, and/or is intended to cover programmed hardware and/or software.

The terms of degree such as "substantially," "about," and "approximately" as used herein are intended to mean a reasonable amount of deviation of the modified term such that the end result is not significantly changed.

While particular embodiments of the present invention have been illustrated and described, it would be obvious to those skilled in the art that various other changes and modifications can be made without departing from the spirit and scope of the invention. For example, the size, shape, positions or orientations of the components can be modified as necessary and/or as intended. The components that are illustrated as directly connected or in contact with each other may have other materials or components interposed between them. The functions of a single element may be implemented by a plurality of elements, or the functions of a plurality of elements may be implemented by a single element. The structure and functions of one embodiment may be applied to other embodiments. A specific embodiment may not produce all the advantages at the same time.

What is claimed is:

1. A terminal to be carried into a moving object or a facility, the terminal comprising:
   a first information obtaining unit configured to obtain positional information of the terminal;
   a time stamp adding unit configured to add a timestamp to the positional information obtained by the first information obtaining unit;
   a second information obtaining unit configured to obtain, from the moving object or the facility, positional information of the moving object or positional information of the terminal in the facility having a timestamp added in a predetermined time unit; and
   an integration unit configured to integrate positional information having a timestamp for which no positional information has been obtained by the first information obtaining unit, selectively from the positional information obtained by the second information obtaining unit, with the positional information obtained by the first information obtaining unit.

2. The terminal according to claim 1, wherein
the second information obtaining unit obtains, from the moving object or the facility, positional information of the moving object or positional information of the terminal in the facility having a timestamp added in the same time cycle as the timestamp added by the time stamp adding unit.

3. The terminal according to claim 1, further comprising:
an action information detection unit configured to detect action information of a user,
wherein the time stamp adding unit adds a timestamp to the action information detected by the action information detection unit,
the second information obtaining unit obtains, from the moving object or the facility, action information of the user of the terminal in the moving object or the facility together with a timestamp, and
the integration unit integrates the action information obtained by the second information obtaining unit with the action information detected by the action information detection unit while associating with the positional information based on the timestamps added to the action information obtained by the second information obtaining unit and the action information detected by the action information detection unit.

4. A terminal to be carried into a moving object or a facility, the terminal comprising:
a first information obtaining unit configured to obtain positional information of the terminal;
a time stamp adding unit configured to add a timestamp to the positional information obtained by the first information obtaining unit;
a second information obtaining unit configured to obtain, from the moving object or the facility, positional information of the moving object or positional information of the terminal in the facility having a timestamp added in a predetermined time unit; and
an integration unit configured to integrate the positional information obtained by the second information obtaining unit and the positional information obtained by the first information obtaining unit by replacing the positional information obtained by the first information obtaining unit with the positional information obtained by the second information obtaining unit when the timestamp added to the positional information obtained by the first information obtaining unit is the same as the timestamp added to the positional information obtained by the second information obtaining unit.

5. The terminal according to claim 4, wherein the second information obtaining unit obtains, from the moving object or the facility, positional information of the moving object or positional information of the terminal in the facility having a timestamp added in the same time cycle as the timestamp added by the time stamp adding unit.

6. The terminal according to claim 4, further comprising:
an action information detection unit configured to detect action information of a user,
wherein the time stamp adding unit adds a timestamp to the action information detected by the action information detection unit,
the second information obtaining unit obtains, from the moving object or the facility, action information of the user of the terminal in the moving object or the facility together with a timestamp, and
the integration unit integrates the action information obtained by the second information obtaining unit with the action information detected by the action information detection unit while associating with the positional information based on the timestamps added to the action information obtained by the second information obtaining unit and the action information detected by the action information detection unit.

7. A terminal to be carried into a moving object or a facility, the terminal comprising:
a first information obtaining unit configured to obtain positional information of the terminal;
a time stamp adding unit configured to add a timestamp to the positional information obtained by the first information obtaining unit;
a second information obtaining unit configured to obtain, from the moving object or the facility, positional information of the moving object or positional information of the terminal in the facility having a timestamp for which no positional information has been obtained by the first information obtaining unit, selectively from positional information of the moving object or positional information of the terminal in the facility having a timestamp added in a predetermined time unit; and
an integration unit configured to integrate the positional information obtained by the second information obtaining unit and the positional information obtained by the first information obtaining unit.

8. The terminal according to claim 7, wherein the second information obtaining unit obtains, from the moving object or the facility, positional information of the moving object or positional information of the terminal in the facility having a timestamp added in the same time cycle as the timestamp added by the time stamp adding unit.

9. The terminal according to claim 7, further comprising:
an action information detection unit configured to detect action information of a user,
wherein the time stamp adding unit adds a timestamp to the action information detected by the action information detection unit,
the second information obtaining unit obtains, from the moving object or the facility, action information of the user of the terminal in the moving object or the facility together with a timestamp, and
the integration unit integrates the action information obtained by the second information obtaining unit with the action information detected by the action information detection unit while associating with the positional information based on the timestamps added to the action information obtained by the second information obtaining unit and the action information detected by the action information detection unit.

* * * * *